(12) United States Patent
Yoshizumi et al.

(10) Patent No.: US 9,470,862 B2
(45) Date of Patent: Oct. 18, 2016

(54) OPTICAL TRANSMISSION DEVICE AND MANUFACTURING METHOD THEREOF

(71) Applicant: FUJITSU LIMITED, Kawasaki-shi, Kanagawa (JP)

(72) Inventors: Takahisa Yoshizumi, Fukuoka (JP); Naoto Hoshiyama, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/524,552

(22) Filed: Oct. 27, 2014

(65) Prior Publication Data
US 2015/0125123 A1    May 7, 2015

(30) Foreign Application Priority Data

Nov. 5, 2013 (JP) ................................. 2013-229687
Sep. 30, 2014 (JP) ................................. 2014-202503

(51) Int. Cl.
*G02B 6/36*  (2006.01)
*G02B 6/42*  (2006.01)

(52) U.S. Cl.
CPC ............. *G02B 6/4269* (2013.01); *G02B 6/428* (2013.01); *G02B 6/4292* (2013.01); *Y10T 29/49826* (2015.01)

(58) Field of Classification Search
None
See application file for complete search history.

(56) References Cited

U.S. PATENT DOCUMENTS

| 6,986,679 | B1* | 1/2006 | Aronson | H01R 25/00 439/170 |
| 8,382,509 | B2* | 2/2013 | David | H01R 13/6471 439/331 |
| 8,599,559 | B1* | 12/2013 | Morrison | H05K 7/20418 361/702 |
| 8,879,262 | B2* | 11/2014 | Shi | 165/104.33 |
| 2003/0161108 | A1 | 8/2003 | Bright et al. | |
| 2006/0128221 | A1 | 6/2006 | Yoshikawa et al. | |
| 2011/0051373 | A1* | 3/2011 | McColloch | G02B 6/4201 361/709 |
| 2012/0300403 | A1* | 11/2012 | Scholeno | H01R 13/6595 361/702 |

FOREIGN PATENT DOCUMENTS

| JP | 2004-222426 | 8/2004 |
| JP | 2005-520296 | 7/2005 |
| JP | 2006-005045 | 1/2006 |
| JP | 2006-108684 | 4/2006 |
| JP | 2006-157305 | 6/2006 |
| JP | 2008-151936 | 7/2008 |
| JP | 2008-256815 | 10/2008 |

* cited by examiner

*Primary Examiner* — Hemang Sanghavi
(74) *Attorney, Agent, or Firm* — Staas & Halsey LLP

(57) ABSTRACT

An optical transmission device includes: a first cage and a second cage provided in parallel on a top surface of a substrate, into which modules connectable to an optical transmission path are inserted, respectively; a first heat sink including: a first main body arranged along surfaces of the first cage and the second cage at the opposite side to the substrate, and a first plate member rising from a bottom surface of the first main body which faces the substrate, and arranged between the first cage and the second cage.

13 Claims, 79 Drawing Sheets

94-2

OPTICAL TRANSMISSION DEVICE AND MANUFACTURING METHOD THEREOF

CROSS-REFERENCE TO RELATED APPLICATIONS

This application is based upon and claims the benefit of priority from the prior Japanese Patent Application No. 2014-202503 filed on Sep. 30, 2014, and the prior Japanese Patent Application No. 2013-229687 filed on Nov. 5, 2013, the entire contents of which are incorporated herein by reference.

FIELD

The embodiments discussed herein are related to an optical transmission device and a manufacturing method thereof.

BACKGROUND

There has conventionally been a pluggable-type module (hereinafter, referred to as a "pluggable module") as an optical module configured to be connected to an optical fiber to transmit and receive an optical signal. The pluggable module is inserted in, for example, a cage provided on a substrate of an optical transmission device so that the pluggable module is electrically connected to an electronic circuit of the optical transmission device to be used.

[Patent Document 1] Japanese Laid-Open Patent Publication No. 2008-256815

However, by the heat generated from the pluggable module, the performance of the pluggable module may be degraded.

In particular, a high speed of an optical transmission rate has been demanded, and the amount of heat generated from the pluggable module tends to be further increased.

Meanwhile, a size of the optical transmission device is required to be reduced.

SUMMARY

According to an aspect of the invention, an optical transmission device includes: a first cage and a second cage provided in parallel on a top surface of a substrate, into which modules connectable to an optical transmission path are inserted, respectively; a first heat sink including: a first main body arranged along surfaces of the first cage and the second cage at the opposite side to the substrate, and a first plate member rising from a bottom surface of the first main body which faces the substrate, and arranged between the first cage and the second cage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
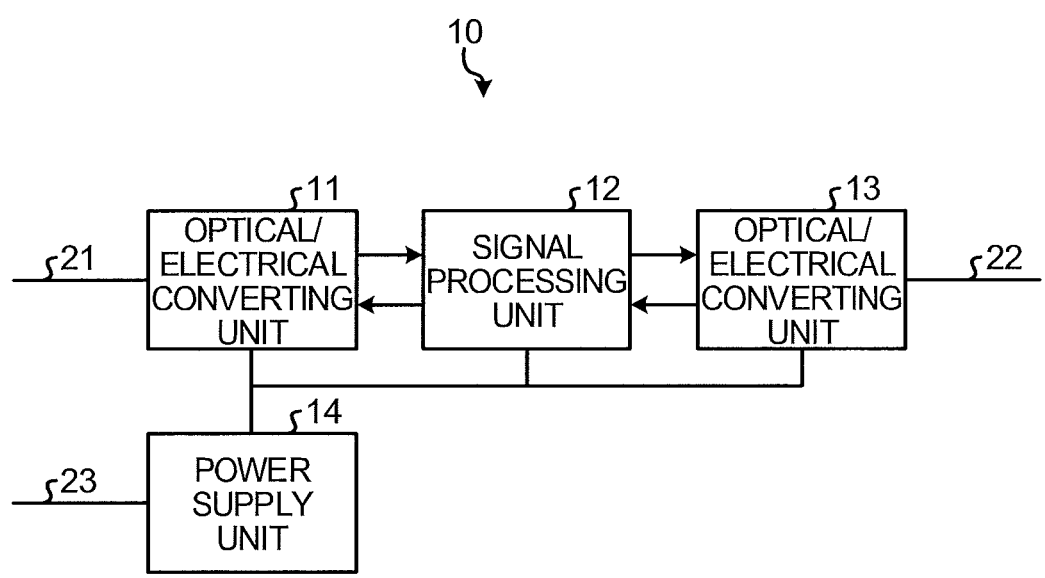
FIG. 1 is a functional block diagram illustrating an example of an optical transmission device of an exemplary embodiment.

Hereinafter, detailed descriptions will be made on specific exemplary embodiments of an optical transmission device and a manufacturing method thereof according to the present disclosure with reference to accompanying drawings. Meanwhile, the optical transmission device and the manufacturing method thereof according to the present disclosure are not limited to the exemplary embodiments. Also, in the exemplary embodiments, some elements having the same functions are given the same reference numerals, and overlapping descriptions thereof will be omitted.

[Configuration of Optical Transmission Device]

FIG. 1 is a functional block diagram illustrating an example of an optical transmission device of an exemplary embodiment. In FIG. 1, an optical transmission device 10 includes an optical/electrical converting unit 11, a signal processing unit 12, an optical/electrical converting unit 13, and a power supply unit 14. In FIG. 1, the configuration of a relaying device as an example of the optical transmission device is illustrated. The following explanation is based on the assumption that the optical transmission device is a submarine device arranged on the seabed.

The optical/electrical converting unit 11 is connected to an optical signal line 21. The optical/electrical converting unit 11 receives an optical signal from the optical signal line 21, converts the received optical signal into an electrical signal, and outputs the converted electrical signal to the signal processing unit 12. The optical/electrical converting unit 11 converts an electrical signal received from the signal processing unit 12 into an optical signal, and outputs the converted optical signal to the optical signal line 21.

The signal processing unit 12 performs a predetermined signal processing on an electrical signal received from the optical/electrical converting unit 11, and outputs the electrical signal which has been subjected to the predetermined signal processing to the optical/electrical converting unit 13. The signal processing unit 12 performs a predetermined signal processing on an electrical signal received from the optical/electrical converting unit 13, and the electrical signal which has been subjected to the predetermined signal processing to the optical/electrical converting unit 11. Here, the predetermined signal processing includes, for example, a demodulation processing, a decoding processing, an amplification processing, a coding processing, and a modulation processing.

The optical/electrical converting unit 13 is connected to an optical signal line 22. The optical/electrical converting unit 13 receives an optical signal from the optical signal line 22, converts the received optical signal into an electrical signal, and outputs the converted electrical signal to the signal processing unit 12. The optical/electrical converting unit 13 converts an electrical signal received from the signal processing unit 12 into an optical signal, and outputs the converted optical signal to the optical signal line 22.

The power supply unit 14 is connected to a power supply line 23. The power supply unit 14 supplies the power received from the power supply line 23 to the optical/electrical converting unit 11, the signal processing unit 12, and the optical/electrical converting unit 13.

Figure 2:
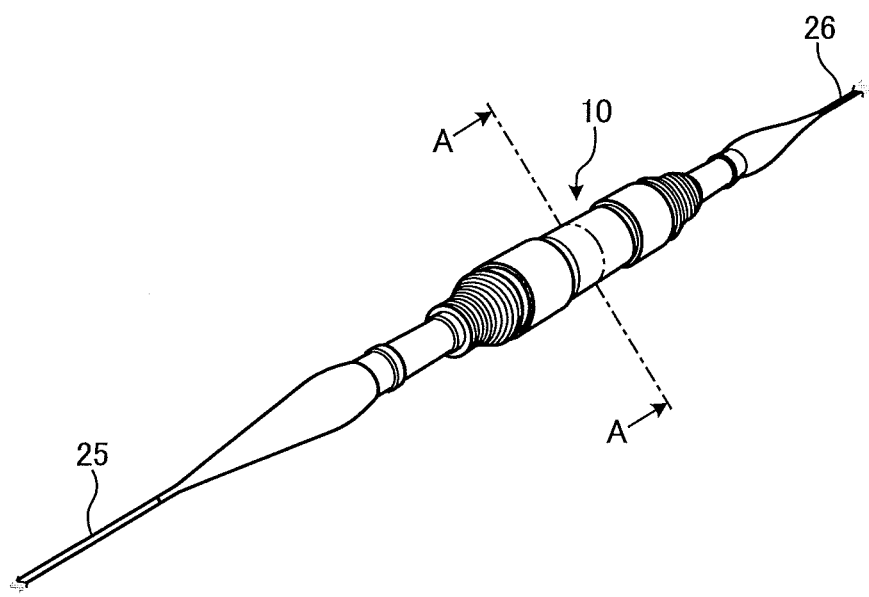
FIG. 2 is a view illustrating an example of an external configuration of the optical transmission device of the exemplary embodiment.

FIG. 2 is a view illustrating an example of an external configuration of the optical transmission device of the exemplary embodiment. The optical transmission device 10 in FIG. 2 is connected to cables 25 and 26. The cable 25 corresponds to the optical signal line 21 and the power supply line 23. The cable 26 corresponds to the optical signal line 22.

Figure 3:
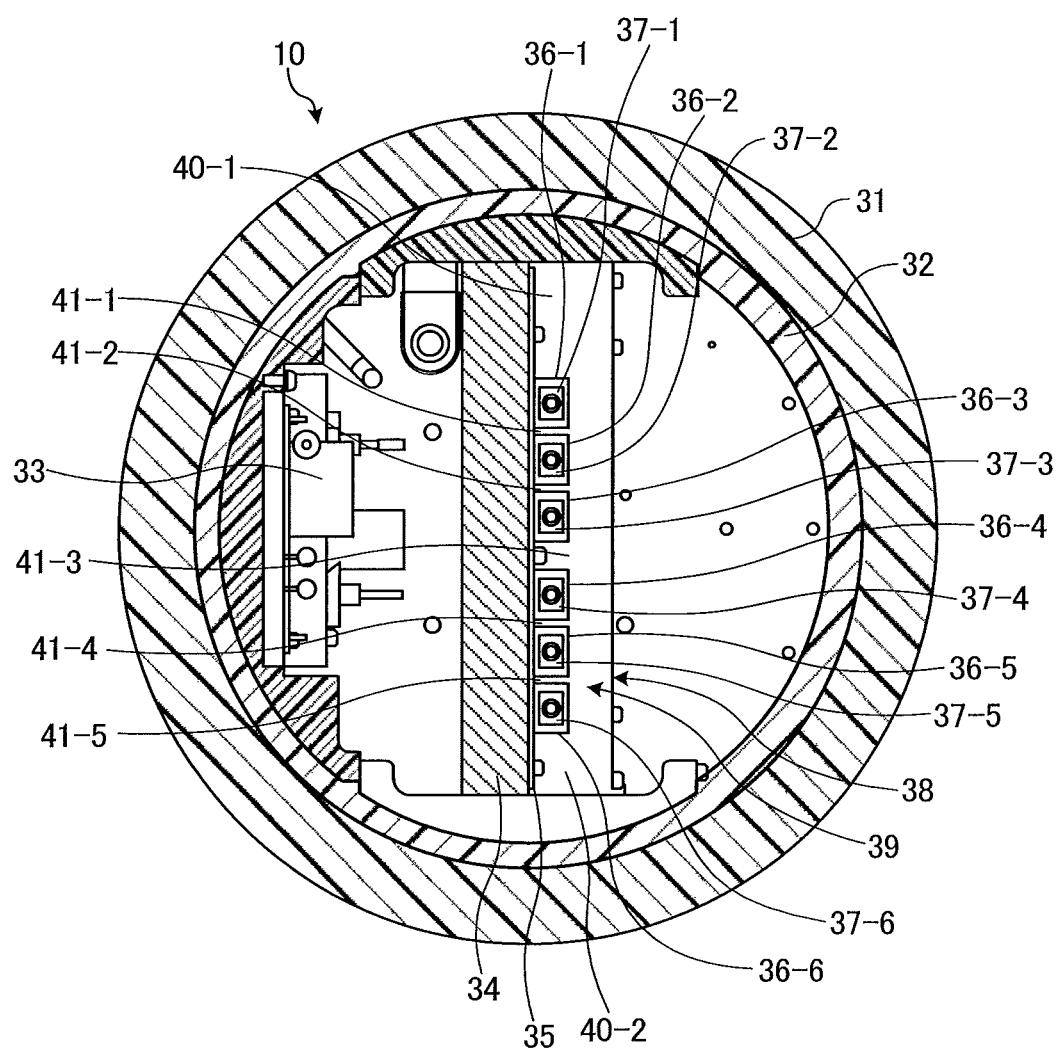
FIG. 3 is a cross-sectional view along the arrow A-A of FIG. 2.

FIG. 3 is a cross-sectional view along the arrow A-A of FIG. 2. In FIG. 3, the optical transmission device 10 includes an outer tube 31, and an outer wall portion 32 fitted in a hollow portion of the outer tube 31.

The optical transmission device 10 includes a power supply unit 33. The power supply unit 33 corresponds to the power supply unit 14.

The optical transmission device 10 includes a heat transfer plate 34. The heat transfer plate 34 is made of, for example, a metal having a high thermal conductivity, such as aluminum or copper. The heat transfer plate 34 is fixed to the outer wall portion 32. A substrate 35 which is a printed circuit board is arranged on the top surface of the heat transfer plate 34.

A plurality of cages 36 (cages 36-1 to 36-6) is provided in parallel on the top surface of the substrate 35, that is, the surface of the substrate 35 at the opposite side to the top surface of the heat transfer plate 34. Here, the number of the cages 36 is six, but is not limited thereto. Pluggable modules 37-1 to 37-6 are inserted in the cages 36-1 to 36-6, respectively. Accordingly, the pluggable modules 37-1 to 37-6 are electrically connected to the circuit printed on the substrate 35. Hereinafter, when the cages 36-1 to 36-6 are not particularly distinguished, the cages 36-1 to 36-6 may be collectively called cages 36. Other elements may be collectively called in the same manner.

The optical transmission device 10 includes a heat sink 38. The heat sink 38 includes a main body 39, pedestal portions 40-1 and 40-2, and plate members 41-1 to 41-5. The main body 39 is arranged along the top surfaces of the cages 36-1 to 36-6 at the opposite side to the top surface of the heat transfer plate 34. Each of the plate members 41-1 to 41-5 is provided to rise from the bottom surface of the main body 39 which faces the top surface of the substrate 35. The pedestal portion 40-1 is provided to rise from the bottom surface of the main body 39 at one end of the main body 39 in a direction perpendicular to the plate members 41. The pedestal portion 40-2 is provided to rise from the bottom surface of the main body 39 at the other end of the main body 39 in a direction perpendicular to the plate members 41. The height of each of the pedestal portions 40-1 and 40-2 in relation to the bottom surface of the main body 39 is larger than the height of each of the plate members 41-1 to 41-5 in relation to the bottom surface of the main body 39.

The pedestal portions 40-1 and 40-2 are arranged so that the bottom surfaces of the pedestal portions 40-1 and 40-2 are abutted on both end portions of the heat transfer plate 34. In this state, each of the plate members 41-1 to 41-5 is arranged between two adjacent cages 36 among the cages 36-1 to 36-6. Accordingly, the heat sink 38 may cover the side surfaces of the cages 36 as well as top surfaces of the cages 36, and thus may efficiently absorb the heat generated from the pluggable modules 37-1 to 37-6 via the cages 36-1 to 36-6. As a result, the heat dissipation efficiency in the optical transmission device 10 may be improved.

[Manufacturing Method of Optical Transmission Device]

A manufacturing method of the optical transmission device configured as described above will be described. FIGS. 4 to 7 are views for explaining the manufacturing method of the optical transmission device of the exemplary embodiment. Herein, especially, referring to FIGS. 4 to 7, an assembly process of the optical transmission device 10 will be described.

Figure 4:
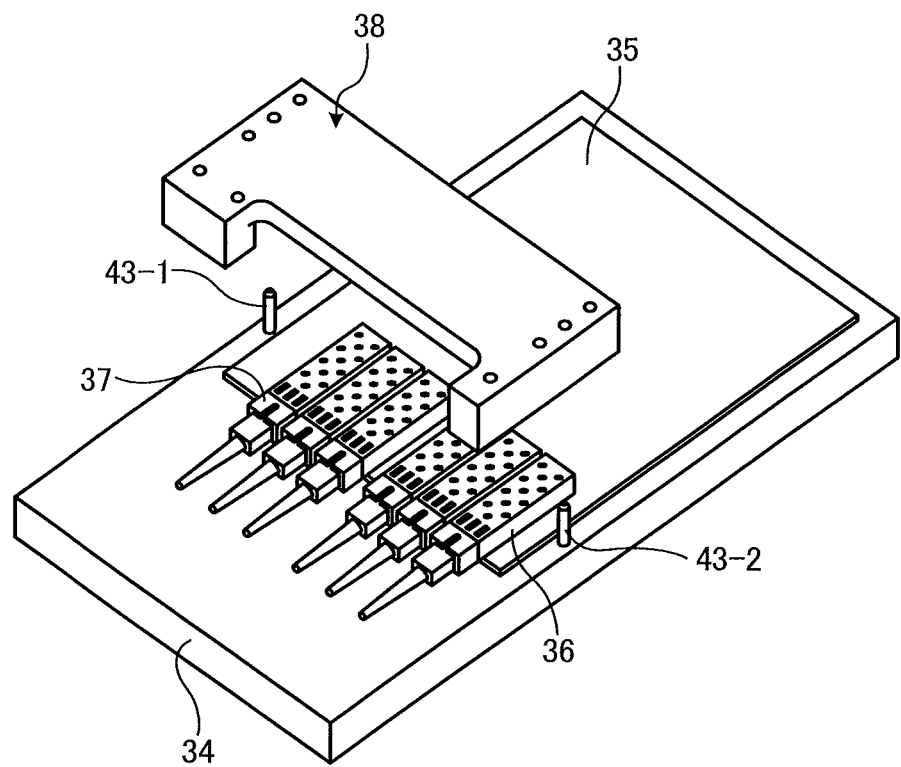
FIG. 4 is a view for explaining a manufacturing method of the optical transmission device of the exemplary embodiment.

As illustrated in FIG. 4, guide pins 43-1 and 43-2 are provided, on the top surface of the heat transfer plate 34, on both end portions of the heat transfer plate 34 which exclude the region where the substrate 35 is arranged. The guide pins 43-1 and 43-2 are provided to rise from the top surface of the heat transfer plate 34. The guide pins 43-1 and 43-2 are longer than the separation distance from the top surface of the substrate 35 to the top surfaces of the cages 36-1 to 36-6.

Figure 5:
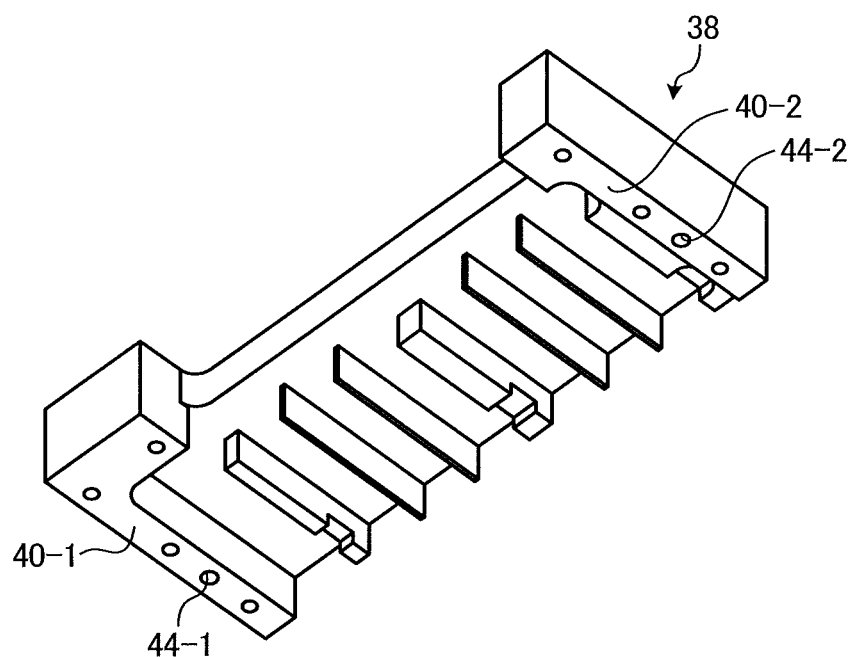
FIG. 5 is a view for explaining the manufacturing method of the optical transmission device of the exemplary embodiment.

As illustrated in FIG. 5, an insertion hole 44-1 into which the guide pin 43-1 is inserted is provided in the pedestal portion 40-1. An insertion hole 44-2 into which the guide pin 43-2 is inserted is provided in the pedestal portion 40-2.

Figure 6:
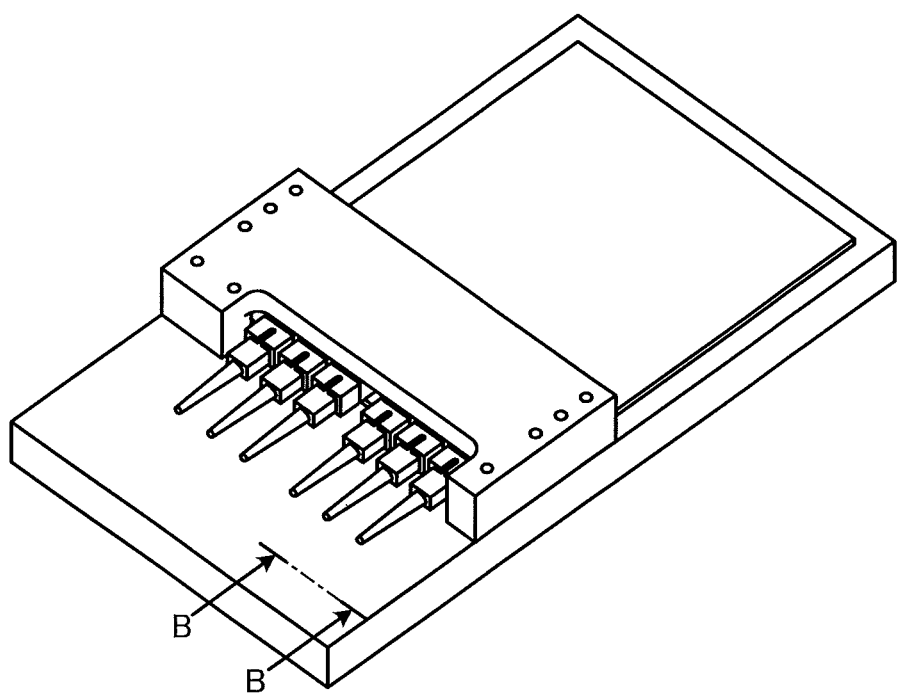
FIG. 6 is a view for explaining the manufacturing method of the optical transmission device of the exemplary embodiment.

As illustrated in FIG. 6, the pedestal portion 40-1 and the pedestal portion 40-2 are provided such that when the guide pin 43-1 and the guide pin 43-2 are inserted into the insertion hole 44-1 and the insertion hole 44-2, the bottom surfaces of the pedestal portion 40-1 and the pedestal portion 40-2 are abutted on the top surface of the substrate 35 or the top surface of the heat transfer plate 34. Here, as described above, the guide pins 43-1 and 43-2 are set to be longer than the separation distance from the top surface of the substrate 35 to the top surfaces of the cages 36-1 to 36-6. Accordingly, the guide pin 43-1 and the guide pin 43-2 may be inserted into the inlets of the insertion hole 44-1 and the insertion hole 44-2 while the plate members 41-1 to 41-5 do not collide with the cages 36-1 to 36-6. Accordingly, in an assembly process of providing the heat sink 38, it is possible to avoid positional deviation or damage of the cages 36-1 to 36-6 due to collision of the heat sink 38.

Figure 7:
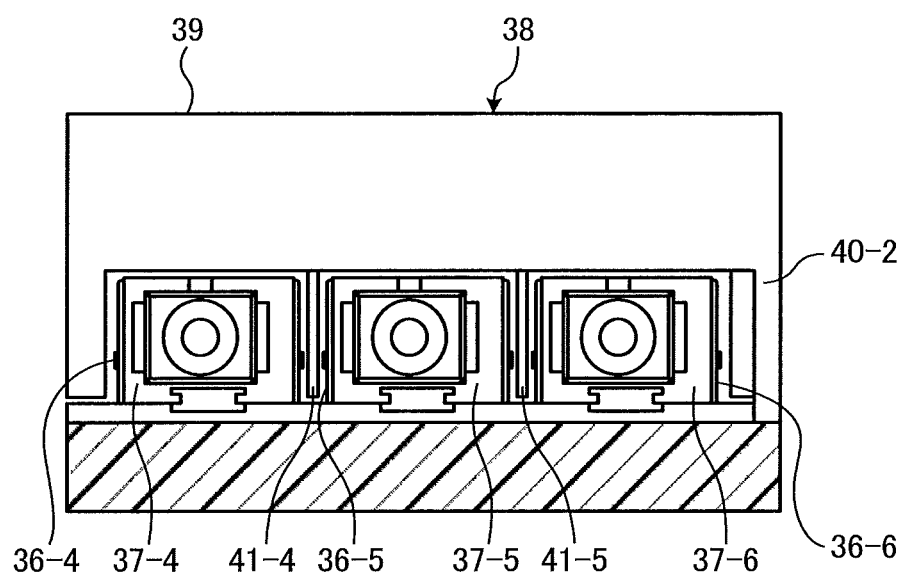
FIG. 7 is a view for explaining the manufacturing method of the optical transmission device of the exemplary embodiment.

Since the guide pin 43-1 and the guide pin 43-2 are inserted into the insertion hole 44-1 and the insertion hole 44-2, each of the plate members 41-1 to 41-5 may be arranged between two adjacent cages 36 among the cages 36-1 to 36-6, as illustrated in FIG. 7. Accordingly, the heat sink 38 may cover the side surfaces of the cages 36 as well as top surfaces of the cages 36, and thus may efficiently absorb the heat generated from the pluggable modules 37-1 to 37-6 via the cages 36-1 to 36-6. As a result, the heat dissipation efficiency in the optical transmission device 10 may be improved.

As described above, according to the present exemplary embodiment, the optical transmission device 10 includes the heat sink 38 which includes the plate members 41 each of which is arranged between two adjacent cages 36.

Through the configuration of the optical transmission device 10, the side surfaces of the cages 36 may also be covered by the heat sink 38, and thus, the heat generated from the pluggable modules 37 may be efficiently absorbed via the cages 36. As a result, the optical transmission device 10 which improves the heat dissipation efficiency may be achieved. Also, since the heat dissipation efficiency may be improved without using a heat dissipation sheet made of a resin, an adverse effect caused by a harmful gas discharged from the resin, such as, for example, sulfur, may be suppressed.

Also, the optical transmission device 10 includes the guide pins 43-1 and 43-2 provided at both end portions of the heat transfer plate 34. In the optical transmission device 10, the insertion holes 44-1 and 44-2 are provided in the pedestal portions 40-1 and 40-2, respectively. The guide pins 43-1 and 43-2 are inserted into the insertion holes 44-1 and 44-2, respectively. The guide pins 43-1 and 43-2 are longer than the separation distance from the top surface of the substrate 35 to the top surfaces of the cages 36.

Through the configuration of the optical transmission device 10, since the plate member 41 may be arranged linearly between two cages 36 by a guide of the guide pins 43-1 and 43-2, it is possible to avoid positional deviation or damage of the cages 36 due to collision of the heat sink 38.

An exemplary embodiment (variation 1) is related to a variation of a guide pin and an insertion hole of the exemplary embodiment.

[Configuration of Optical Transmission Device]

Figure 8:
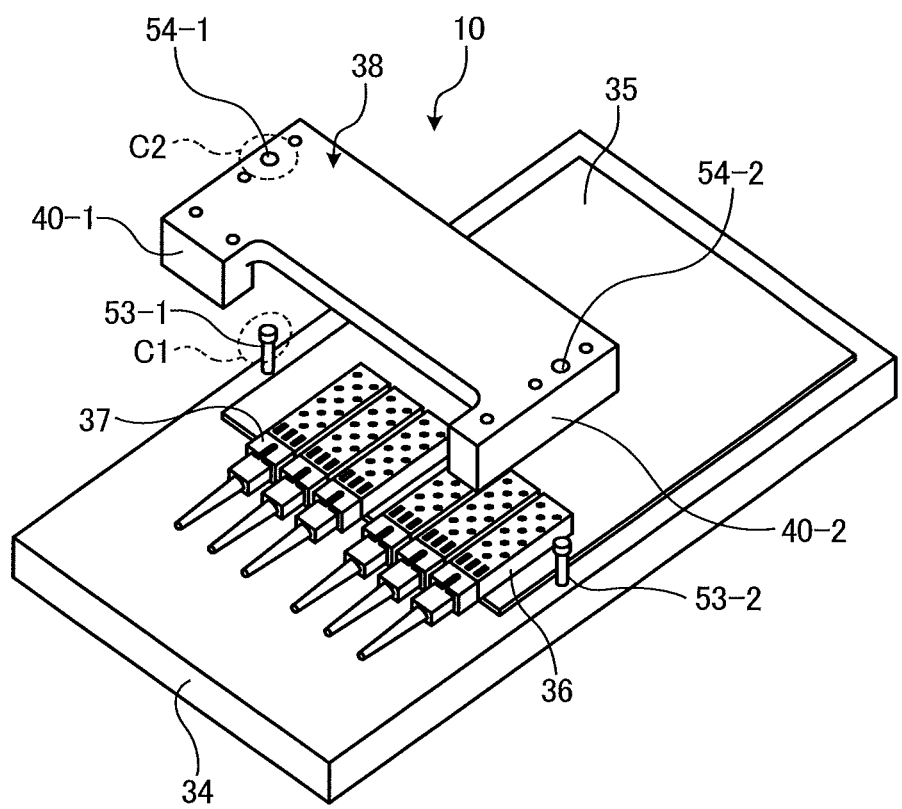
FIG. 8 is a view for explaining a configuration example of an optical transmission device of an exemplary embodiment (variation 1)

FIG. 8 is a view for explaining a configuration example of an optical transmission device of the exemplary embodiment (variation 1).

Figure 9:
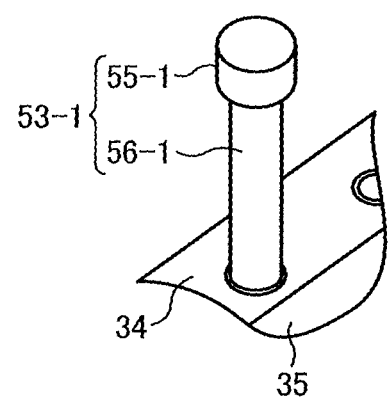
FIG. 9 is a view illustrating a guide pin within a circle C1, in an enlarged scale.

As illustrated in FIG. 8, the optical transmission device 10 of the exemplary embodiment (variation 1) includes guide pins 53-1 and 53-2. FIG. 9 is a view illustrating the guide pin 53-1 within a circle C1, in an enlarged scale. As illustrated in FIG. 9, the guide pin 53-1 includes a rod-shaped portion 56-1 and a rod-shaped portion 55-1 having a larger cross-sectional area than the rod-shaped portion 56-1. Although not illustrated, the guide pin 53-2 has the same configuration as that of the guide pin 53-1, and includes a rod-shaped portion 56-2 and a rod-shaped portion 55-2 having a larger cross-sectional area than the rod-shaped portion 56-2.

Figure 10:
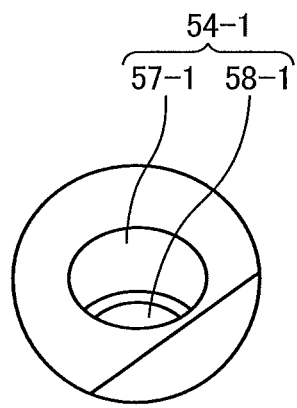
FIG. 10 is a view illustrating an insertion hole within a circle C2, in an enlarged scale.

As illustrated in FIG. 8, insertion holes 54-1 and 54-2 are provided in the heat sink 38 of the exemplary embodiment (variation 1). FIG. 10 is a view illustrating the insertion hole 54-1 within a circle C2, in an enlarged scale. As illustrated in FIG. 10, the insertion hole 54-1 includes a cylindrical portion 58-1 and a cylindrical portion 57-1 having a larger diameter than the cylindrical portion 58-1. Although not illustrated, the insertion hole 54-2 has the same configuration as that of the insertion hole 54-1, and includes a cylindrical portion 58-2 and a cylindrical portion 57-2 having a larger diameter than the cylindrical portion 58-2. The cylindrical portion 57-1 and the cylindrical portion 57-2 accommodate the rod-shaped portion 55-1 and the rod-shaped portion 55-2, respectively, in a state where the guide pins 53-1 and 53-2 are inserted into the insertion holes 54-1 and 54-2, respectively. Here, the diameter of the cylindrical portion 58-1 is substantially the same as or slightly larger than the diameter of the rod-shaped portion 55-1. The diameter of the cylindrical portion 58-2 is substantially the same or slightly larger than the diameter of the rod-shaped portion 55-2. The diameter of the cylindrical portion 57-1 is larger than the diameter of the rod-shaped portion 55-1. The diameter of the cylindrical portion 57-2 is larger than the diameter of the rod-shaped portion 55-2. In the illustration of FIG. 8, the cylindrical portions 57-1 and 57-2 are opened at the top surface of the heat sink 38, but the present disclosure is not limited thereto. The cylindrical portions 57-1 and 57-2 may not be opened.

[Manufacturing Method of Optical Transmission Device]

A manufacturing method of the optical transmission device configured as described above will be described. FIGS. 11 to 19 are views for explaining the manufacturing method of the optical transmission device of the exemplary embodiment (variation 1). Herein, especially, referring to FIGS. 11 to 19, an assembly process of the optical transmission device 10 of the exemplary embodiment (variation 1) will be described.

Figure 11:
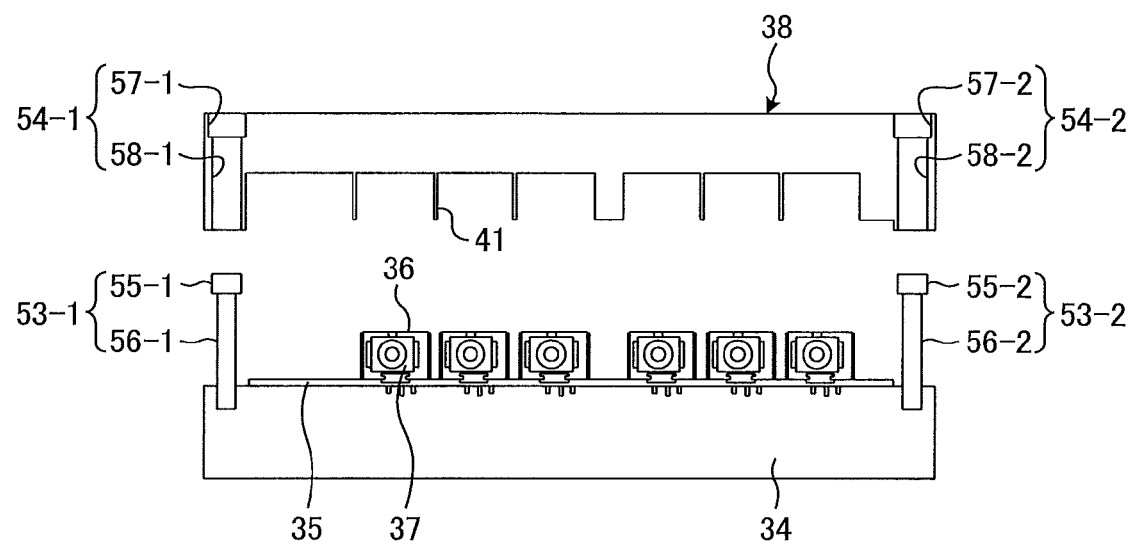
FIG. 11 is a view for explaining a manufacturing method of the optical transmission device of the exemplary embodiment (variation 1)
Figure 12:
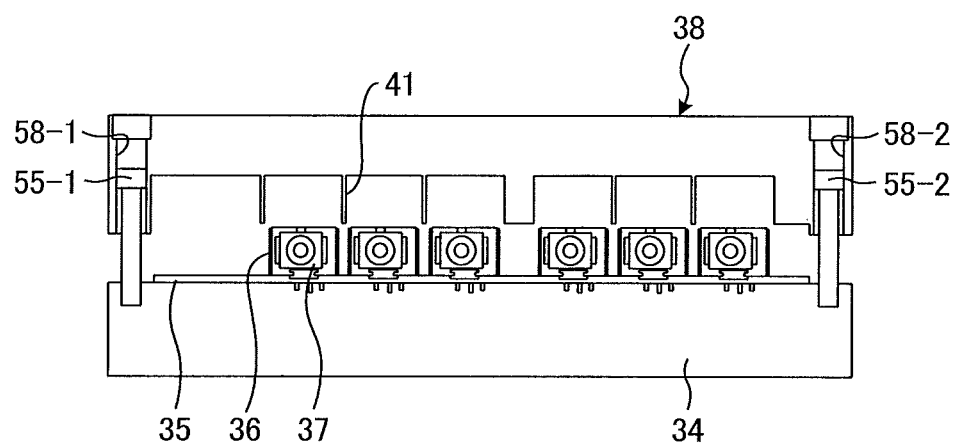
FIG. 12 is a view for explaining the manufacturing method of the optical transmission device of the exemplary embodiment (variation 1)
Figure 13:
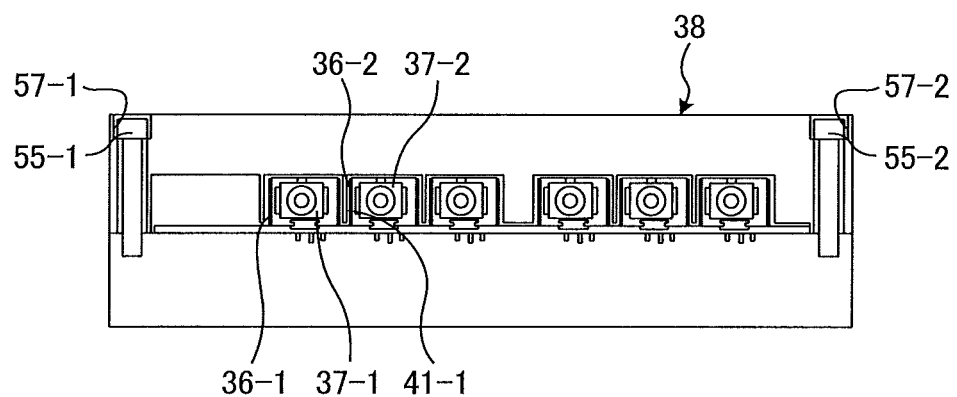
FIG. 13 is a view for explaining the manufacturing method of the optical transmission device of the exemplary embodiment (variation 1)
Figure 14:
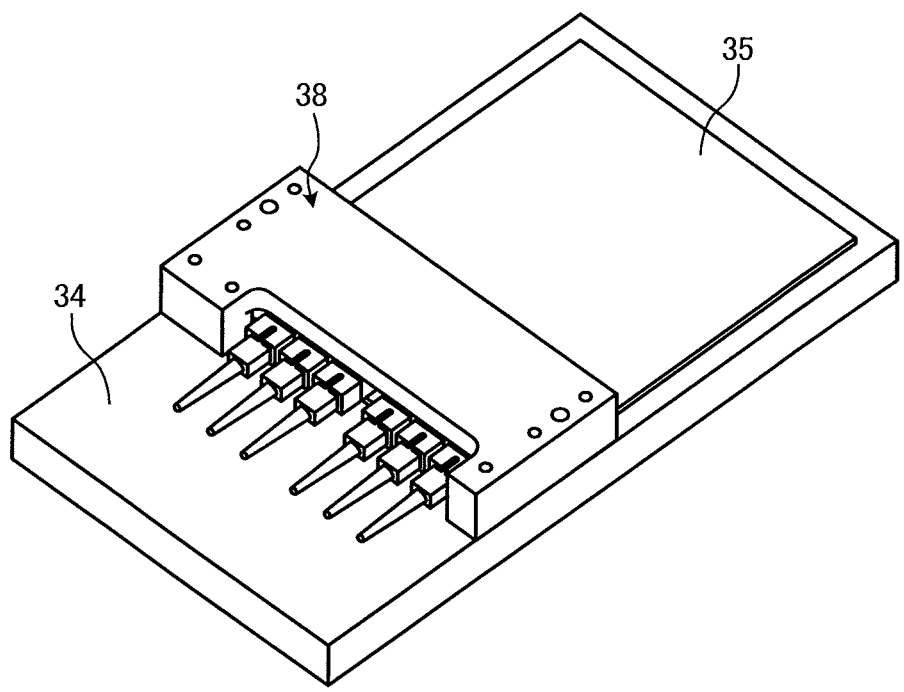
FIG. 14 is a view for explaining the manufacturing method of the optical transmission device of the exemplary embodiment (variation 1)
Figure 15:
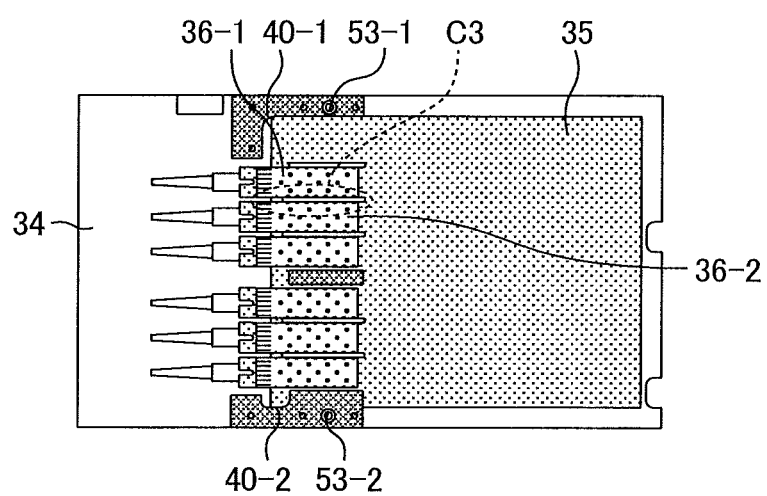
FIG. 15 is a view for explaining the manufacturing method of the optical transmission device of the exemplary embodiment (variation 1)
Figure 16:
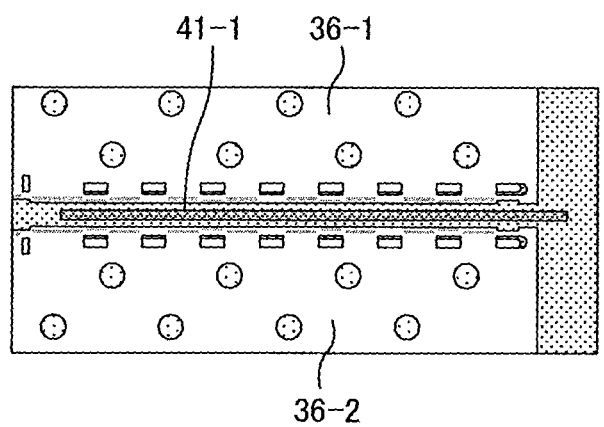
FIG. 16 is a view for explaining the manufacturing method of the optical transmission device of the exemplary embodiment (variation 1)

As illustrated in FIGS. 11 to 13, the guide pins 53-1 and 53-2 are inserted into the insertion holes 54-1 and 54-2, respectively. The guide pins 53-1 and 53-2 are set to be longer than the separation distance from the top surface of the substrate 35 to the top surfaces of the cages 36-1 to 36-6. As described above, the diameter of the cylindrical portion 58-1 is set to be substantially the same as or slightly larger than the diameter of the rod-shaped portion 55-1. Also, the diameter of the cylindrical portion 58-2 is set to be substantially the same or slightly larger than the diameter of the rod-shaped portion 55-2. Accordingly, since each of the plate members 41-1 to 41-5 may be arranged linearly between two adjacent cages 36 among the cages 36-1 to 36-6 by a guide of the guide pins 53-1 and 53-2, the plate members 41-1 to 41-5 may be avoided from colliding with the cages 36-1 to 36-6. That is, as illustrated in FIGS. 14 to 16, for example, when attention is paid to the cages 36-1 and 36-2 and the plate member 41-1 surrounded by a circle C3, the plate member 41-1 is arranged in parallel to both the side surface of the cage 36-1 and the side surface of the cage 36-2.

Figure 17:
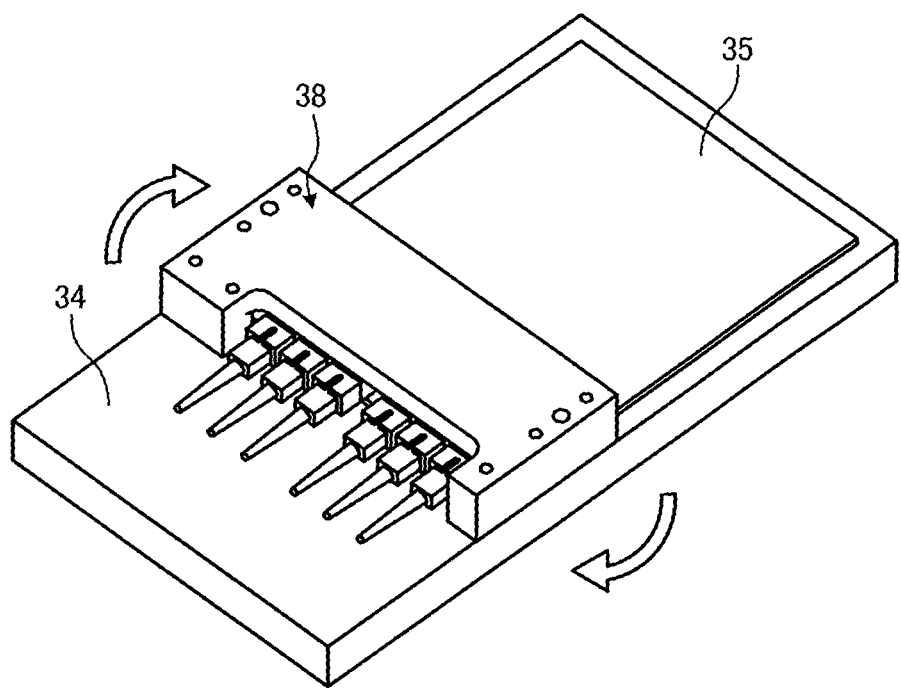
FIG. 17 is a view for explaining the manufacturing method of the optical transmission device of the exemplary embodiment (variation 1)
Figure 18:
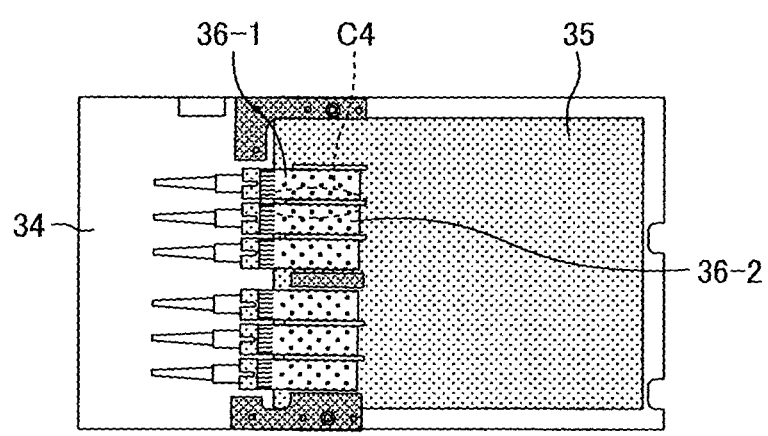
FIG. 18 is a view for explaining the manufacturing method of the optical transmission device of the exemplary embodiment (variation 1)
Figure 19:
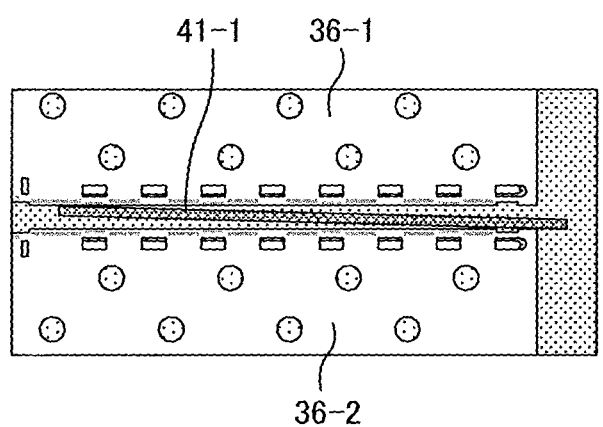
FIG. 19 is a view for explaining the manufacturing method of the optical transmission device of the exemplary embodiment (variation 1)

In this state, as illustrated in FIG. 17, the heat sink 38 is rotated along the top surface of the heat transfer plate 34 (that is, in the plane parallel to the top surface of the heat transfer plate 34). This rotation is enabled by the fact that the diameter of the cylindrical portion 57-1 is larger than the diameter of the rod-shaped portion 55-1, and the diameter of the cylindrical portion 57-2 is larger than the diameter of the rod-shaped portion 55-2. By the rotation, as illustrated in FIGS. 18 and 19, when attention is paid to the cages 36-1 and 36-2 and the plate member 41-1 surrounded by a circle C4, one end of the plate member 41-1 comes close to the side surface of the cage 36-1, and the other end of the plate member 41-1 comes close to the side surface of the cage 36-2. As a result, the heat sink 38 may further efficiently absorb the heat generated from the pluggable modules 37-1 to 37-6 via the cages 36-1 to 36-6.

As described above, according to the present exemplary embodiment, the optical transmission device 10 includes the guide pins 53-1 and 53-2 provided at both end portions of the heat transfer plate 34. In the optical transmission device 10, the insertion holes 54-1 and 54-2 are provided in the pedestal portions 40-1 and 40-2, respectively. The guide pins 53-1 and 53-2 are inserted into the insertion holes 54-1 and 54-2, respectively. The guide pin 53-1 includes the rod-shaped portion 56-1 and the rod-shaped portion 55-1 having a larger cross-sectional area than the rod-shaped portion 56-1. The guide pin 53-2 includes the rod-shaped portion 56-2 and the rod-shaped portion 55-2 having a larger cross-sectional area than the rod-shaped portion 56-2. The insertion hole 54-1 includes the cylindrical portion 58-1 and the cylindrical portion 57-1 having a larger diameter than the cylindrical portion 58-1. The insertion hole 54-2 includes the cylindrical portion 58-2 and the cylindrical portion 57-2 having a larger diameter than the cylindrical portion 58-2.

Through the configuration of the optical transmission device 10, since the plate member 41 may be arranged linearly between two cages 36 by a guide of the guide pins 53-1 and 53-2, it is possible to avoid positional deviation or damage of the cages 36 due to collision of the heat sink 38. Also, since it becomes possible to rotate the heat sink 38 along the top surface of the heat transfer plate 34, the plate member 41 is allowed to come closer to the side surfaces of the cages 36. As a result, it is possible to more efficiently absorb the heat generated from the pluggable modules 37 via the cages 36. As a result, the optical transmission device 10 which improves the heat dissipation efficiency may be achieved.

An exemplary embodiment (variation 2) is related to a variation of a guide pin and an insertion hole of the exemplary embodiment.

[Configuration of Optical Transmission Device]

Figure 20:
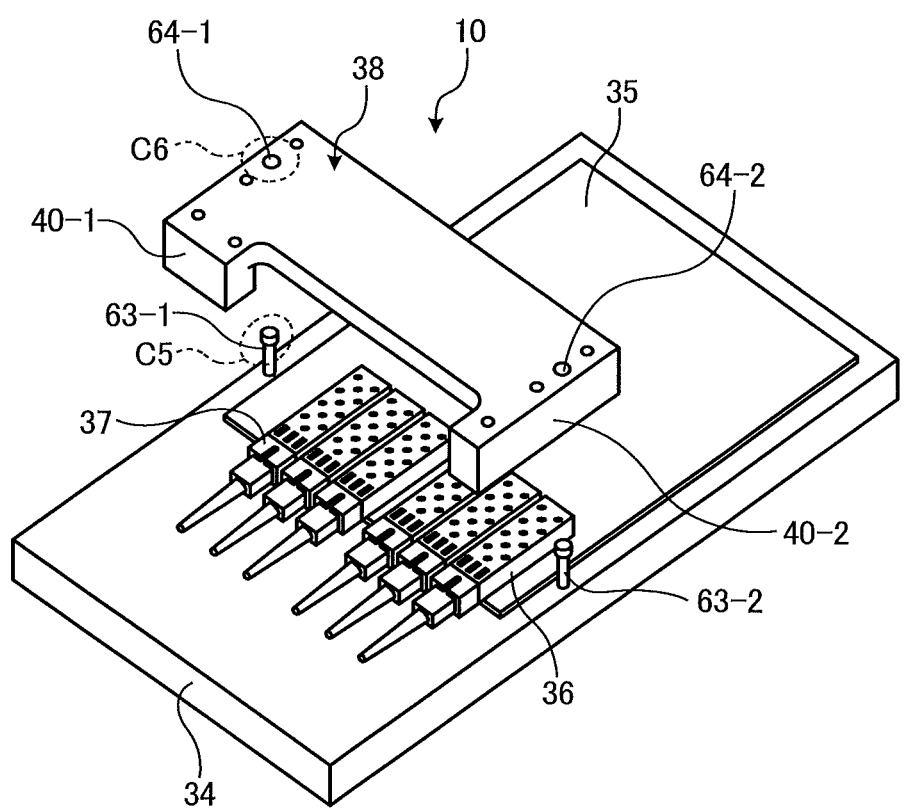
FIG. 20 is a view for explaining a configuration example of an optical transmission device of an exemplary embodiment (variation 2)

FIG. 20 is a view for explaining a configuration example of an optical transmission device of the exemplary embodiment (variation 2).

Figure 21:
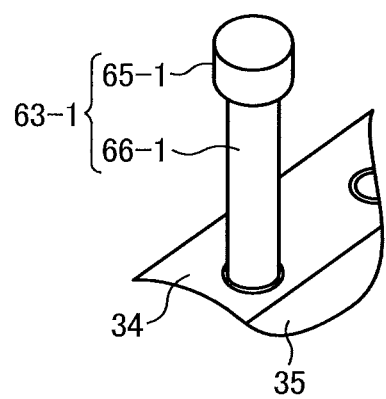
FIG. 21 is a view illustrating a guide pin within a circle C5, in an enlarged scale.

As illustrated in FIG. 20, the optical transmission device 10 of the exemplary embodiment (variation 2) includes guide pins 63-1 and 63-2. FIG. 21 is a view illustrating the guide pin 63-1 within a circle C5, in an enlarged scale. As illustrated in FIG. 21, the guide pin 63-1 includes a rod-shaped portion 66-1 and a rod-shaped portion 65-1 having a larger cross-sectional area than the rod-shaped portion 66-1. Although not illustrated, the guide pin 63-2 has the same configuration as that of the guide pin 63-1, and includes a rod-shaped portion 66-2 and a rod-shaped portion 65-2 having a larger cross-sectional area than the rod-shaped portion 66-2.

Figure 22:
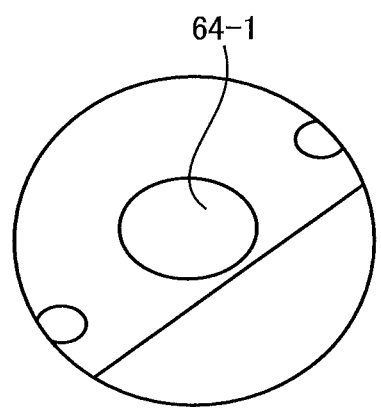
FIG. 22 is a view illustrating an insertion hole within a circle C6, in an enlarged scale.

As illustrated in FIG. 20, insertion holes 64-1 and 64-2 are provided in the heat sink 38 of the exemplary embodiment (variation 2). FIG. 22 is a view illustrating the insertion hole 64-1 within a circle C6, in an enlarged scale. As illustrated in FIG. 22, the insertion hole 64-1 is formed into a cylindrical shape having a fixed diameter. Although not illustrated, the insertion hole 64-2 has the same configuration as that of the insertion hole 64-1. Here, the diameter of the insertion hole 64-1 is substantially the same as or slightly larger than the diameter of the rod-shaped portion 65-1. The diameter of the insertion hole 64-2 is substantially the same as or slightly larger than the diameter of the rod-shaped portion 65-2. The diameter of the insertion hole 64-1 is larger than the diameter of the rod-shaped portion 66-1. The diameter of the insertion hole 64-2 is larger than the diameter of the rod-shaped portion 66-2.

[Manufacturing Method of Optical Transmission Device]

Figure 23:
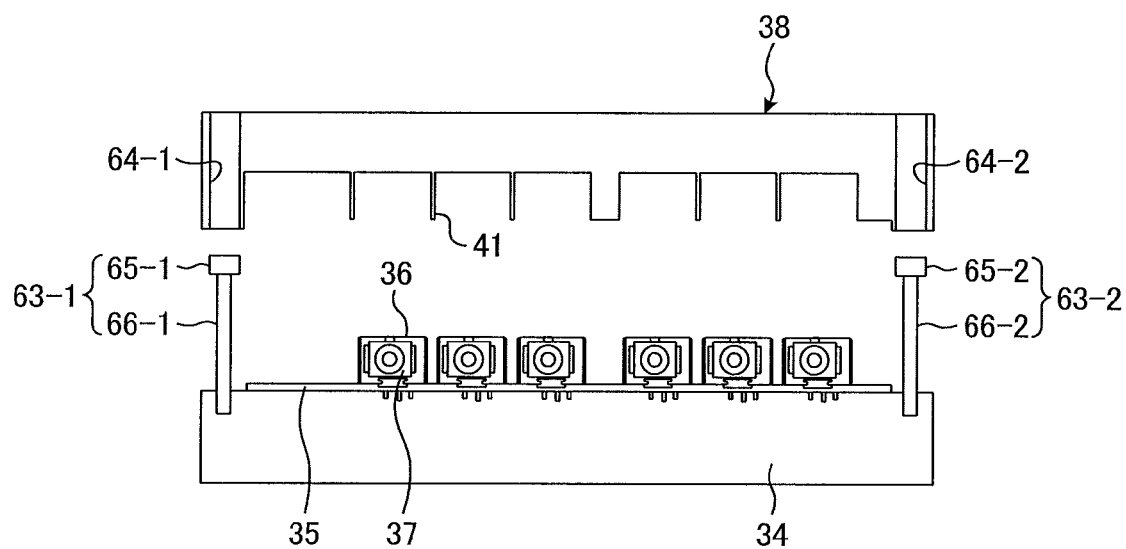
FIG. 23 is a view for explaining a manufacturing method of the optical transmission device of the exemplary embodiment (variation 2)
Figure 24:
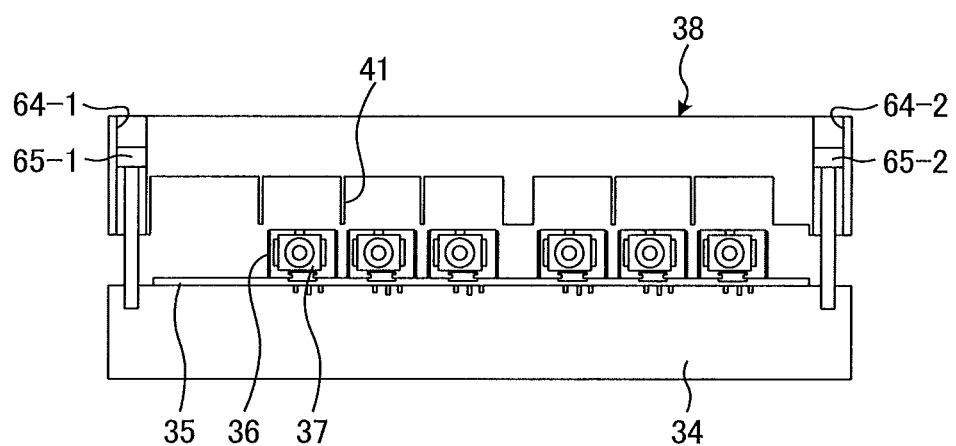
FIG. 24 is a view for explaining the manufacturing method of the optical transmission device of the exemplary embodiment (variation 2)
Figure 25:
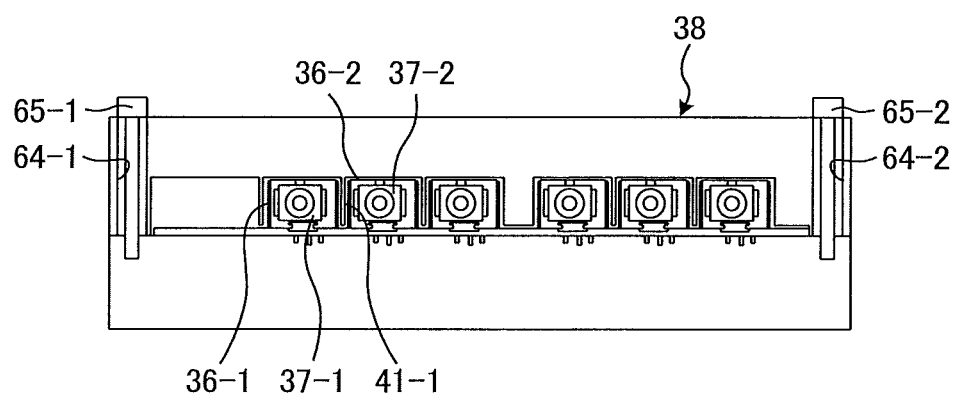
FIG. 25 is a view for explaining the manufacturing method of the optical transmission device of the exemplary embodiment (variation 2)

A manufacturing method of the optical transmission device configured as described above will be described. FIGS. 23 to 25 are views for explaining the manufacturing method of the optical transmission device of the exemplary embodiment (variation 2). Herein, especially, referring to FIGS. 23 to 25, an assembly process of the optical transmission device 10 of the exemplary embodiment (variation 2) will be described.

As illustrated in FIGS. 23 to 25, the guide pins 63-1 and 63-2 are inserted into the insertion holes 64-1 and 64-2, respectively. The guide pins 63-1 and 63-2 are set to be longer than the separation distance from the top surface of the substrate 35 to the top surfaces of the cages 36-1 to 36-6. As described above, the diameter of the insertion hole 64-1 is set to be substantially the same as or slightly larger than the diameter of the rod-shaped portion 65-1. Also, the diameter of the insertion hole 64-2 is set to be substantially the same as or slightly larger than the diameter of the rod-shaped portion 65-2. Accordingly, since each of the plate members 41-1 to 41-5 may be arranged linearly between two adjacent cages 36 among the cages 36-1 to 36-6 by a guide of the guide pins 63-1 and 63-2, the plate members 41-1 to 41-5 may be avoided from colliding with the cages 36-1 to 36-6. The length of the guide pin 63-1 is longer than the separation distance from the bottom surface of the pedestal portion 40-1 to the top surface of the main body 39, and the length of the guide pin 63-2 is longer than the separation distance from the bottom surface of the pedestal portion 40-2 to the top surface of the main body 39. Accordingly, as illustrated in FIG. 25, the rod-shaped portion 65-1 and the rod-shaped portion 65-2 protrude from the insertion hole 64-1 and the insertion hole 64-2.

In this state, in the same manner as in the exemplary embodiment (variation 1), the heat sink 38 is rotated along the top surface of the heat transfer plate 34 (that is, in the plane parallel to the top surface of the heat transfer plate 34). This rotation is enabled by the fact that the rod-shaped portions 65-1 and 65-2 protrude from the insertion holes 64-1 and 64-2, the diameter of the insertion hole 64-1 is larger than the diameter of the rod-shaped portion 65-1, and the diameter of the insertion hole 64-2 is larger than the diameter of the rod-shaped portion 65-2. By the rotation, when attention is paid to the cages 36-1 and 36-2 and the plate member 41-1, one end of the plate member 41-1 comes close to the side surface of the cage 36-1, and the other end of the plate member 41-1 comes close to the side surface of the cage 36-2. As a result, the heat sink 38 may further efficiently absorb the heat generated from the pluggable modules 37-1 to 37-6 via the cages 36-1 to 36-6.

As described above, according to the present exemplary embodiment, the optical transmission device 10 includes the guide pins 63-1 and 63-2 provided at both end portions of the heat transfer plate 34. In the optical transmission device 10, the insertion holes 64-1 and 64-2 are provided in the pedestal portions 40-1 and 40-2, respectively. The guide pins 63-1 and 63-2 are inserted into the insertion holes 64-1 and 64-2, respectively. The guide pin 63-1 includes the rod-shaped portion 66-1 and the rod-shaped portion 65-1 having a larger cross-sectional area than the rod-shaped portion 66-1. The guide pin 63-2 includes the rod-shaped portion 66-2 and the rod-shaped portion 65-2 having a larger cross-sectional area than the rod-shaped portion 66-2. Each of the insertion holes 64-1 and 64-2 is formed into a cylindrical shape having a fixed diameter. The length of the guide pin 63-1 is longer than the separation distance from the bottom surface of the pedestal portion 40-1 to the top surface of the main body 39, and the length of the guide pin 63-2 is longer than the separation distance from the bottom surface of the pedestal portion 40-2 to the top surface of the main body 39.

Through the configuration of the optical transmission device 10, since the plate member 41 may be arranged linearly between two cages 36 by a guide of the guide pins 63-1 and 63-2, it is possible to avoid positional deviation or damage of the cages 36 due to collision of the heat sink 38. Also, since it becomes possible to rotate the heat sink 38 along the top surface of the heat transfer plate 34, the plate member 41 is allowed to come closer to the side surfaces of the cages 36. As a result, it is possible to more efficiently absorb the heat generated from the pluggable modules 37 via the cages 36. As a result, the optical transmission device 10 which improves the heat dissipation efficiency may be achieved.

An exemplary embodiment (variation 3) is related to a variation of a guide pin and an insertion hole of the exemplary embodiment.

[Configuration of Optical Transmission Device]

Figure 26:
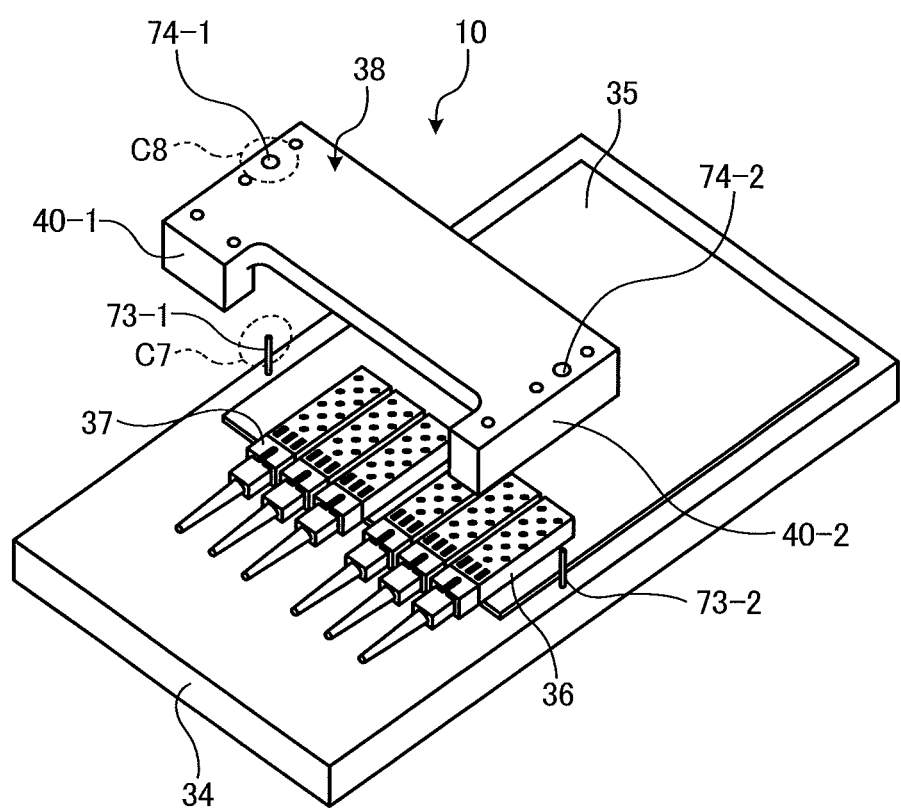
FIG. 26 is a view for explaining a configuration example of an optical transmission device of an exemplary embodiment (variation 3)

FIG. 26 is a view for explaining a configuration example of an optical transmission device of the exemplary embodiment (variation 3).

Figure 27:
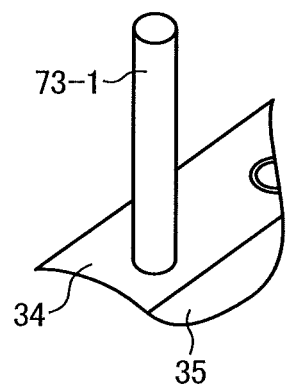
FIG. 27 is a view illustrating a guide pin within a circle C7, in an enlarged scale.

As illustrated in FIG. 26, the optical transmission device 10 of the exemplary embodiment (variation 3) includes guide pins 73-1 and 73-2. FIG. 27 is a view illustrating the guide pin 73-1 within a circle C7, in an enlarged scale. As illustrated in FIG. 27, the guide pin 73-1 is formed into a rod shape having a fixed diameter. Although not illustrated, the guide pin 73-2 has the same configuration as that of the guide pin 73-1.

Figure 28:
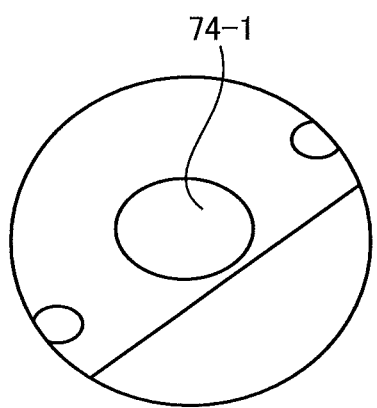
FIG. 28 is a view illustrating an insertion hole within a circle C8, in an enlarged scale.

As illustrated in FIG. 26, insertion holes 74-1 and 74-2 are provided in the heat sink 38 of the exemplary embodiment (variation 3). FIG. 28 is a view illustrating the insertion hole 74-1 within a circle C8, in an enlarged scale. As illustrated in FIG. 28, the insertion hole 74-1 is formed into a cylindrical shape having a fixed diameter. Although not illustrated, the insertion hole 74-2 has the same configuration as that of the insertion hole 74-1. Here, the diameter of the insertion hole 74-1 is larger than the diameter of the guide pin 73-1. The diameter of the insertion hole 74-2 is larger than the diameter of the guide pin 73-2.

[Manufacturing Method of Optical Transmission Device]

Figure 29:
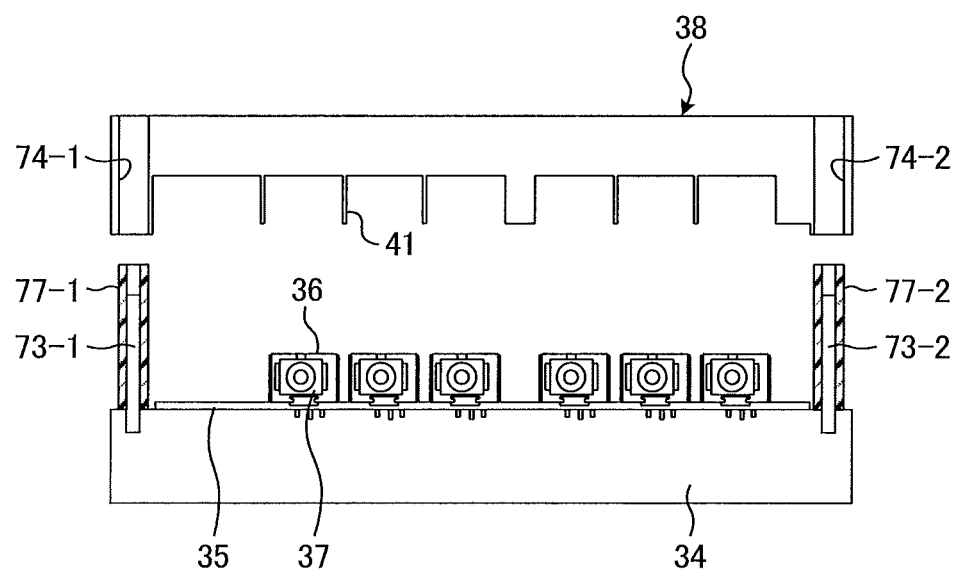
FIG. 29 is a view for explaining a manufacturing method of the optical transmission device of the exemplary embodiment (variation 3)
Figure 30:
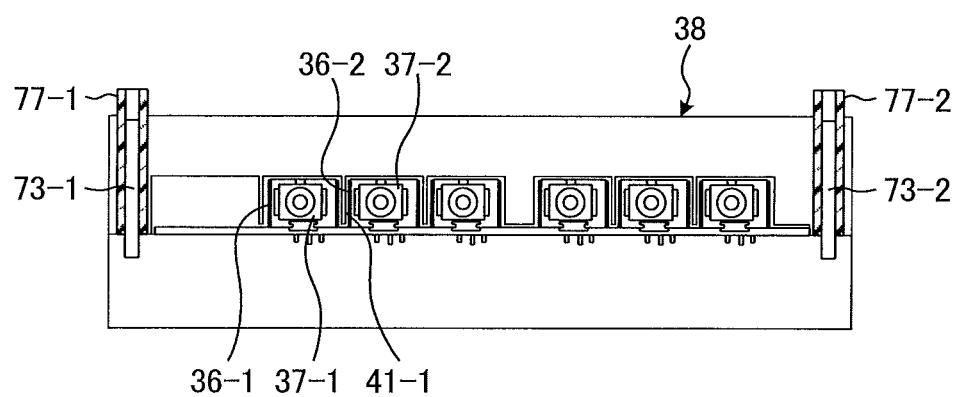
FIG. 30 is a view for explaining the manufacturing method of the optical transmission device of the exemplary embodiment (variation 3)
Figure 31:
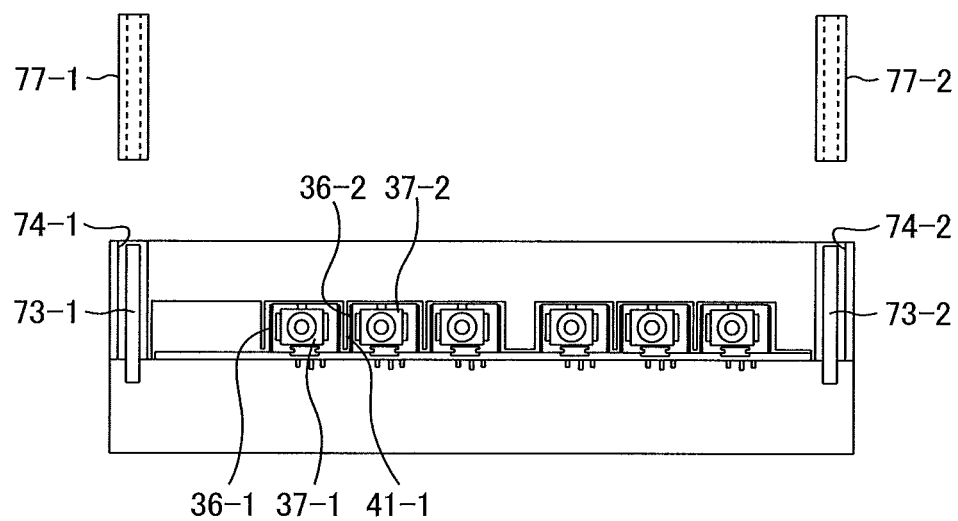
FIG. 31 is a view for explaining the manufacturing method of the optical transmission device of the exemplary embodiment (variation 3)

A manufacturing method of the optical transmission device configured as described above will be described. FIGS. 29 to 31 are views for explaining the manufacturing method of the optical transmission device of the exemplary embodiment (variation 3). Herein, especially, referring to FIGS. 29 to 31, an assembly process of the optical transmission device 10 of the exemplary embodiment (variation 3) will be described.

As illustrated in FIG. 29, tubular sleeves 77-1 and 77-2 are fitted onto the guide pins 73-1 and 73-2. The inner diameter of the sleeve 77-1 is substantially the same as or slightly larger than the diameter of the guide pin 73-1. The inner diameter of the sleeve 77-2 is substantially the same as or slightly larger than the diameter of the guide pin 73-2.

In this state, as illustrated in FIG. 30, the sleeves 77-1 and 77-2 are inserted into the insertion holes 74-1 and 74-2, respectively. The outer diameter of the sleeve 77-1 is substantially the same as or slightly smaller than the diameter of the insertion hole 74-1. The outer diameter of the sleeve 77-2 is substantially the same as or slightly smaller than the diameter of the insertion hole 74-2. Accordingly, since each of the plate members 41-1 to 41-5 may be arranged linearly between two adjacent cages 36 among the cages 36-1 to 36-6 by the guide pins 73-1 and 73-2 and the sleeves 77-1 and 77-2, the plate members 41-1 to 41-5 may be avoided from colliding with the cages 36-1 to 36-6.

In this state, as illustrated in FIG. 31, the sleeves 77-1 and 77-2 are pulled out.

Then, in the same manner as in the exemplary embodiment (variation 1), the heat sink 38 is rotated along the top surface of the heat transfer plate 34 (that is, in the plane parallel to the top surface of the heat transfer plate 34). This rotation is enabled by the fact that the diameter of the insertion hole 74-1 is larger than the diameter of the guide pin 73-1, and the diameter of the insertion hole 74-2 is larger than the diameter of the guide pin 73-2. By the rotation, when attention is paid to the cages 36-1 and 36-2 and the plate member 41-1, one end of the plate member 41-1 comes close to the side surface of the cage 36-1, and the other end of the plate member 41-1 comes close to the side surface of the cage 36-2. As a result, the heat sink 38 may further efficiently absorb the heat generated from the pluggable modules 37-1 to 37-6 via the cages 36-1 to 36-6.

As described above, according to the present exemplary embodiment, the optical transmission device 10 includes the guide pins 73-1 and 73-2 provided at both end portions of the heat transfer plate 34. In the optical transmission device 10, the insertion holes 74-1 and 74-2 are provided in the pedestal portions 40-1 and 40-2, respectively. The guide pins 73-1 and 73-2 are inserted into the insertion holes 74-1 and 74-2, respectively. The guide pins 73-1 and 73-2 are longer than the separation distance from the top surface of the substrate 35 to the top surfaces of the cages 36. The diameter of the insertion hole 74-1 is larger than the diameter of the guide pin 73-1, and the diameter of the insertion hole 74-2 is larger than the diameter of the guide pin 73-2.

Through the configuration of the optical transmission device 10, since the plate member 41 may be arranged linearly between two cages 36 by a guide of the guide pins 73-1 and 73-2, it is possible to avoid positional deviation or damage of the cages 36 due to collision of the heat sink 38. Also, since it becomes possible to rotate the heat sink 38 along the top surface of the heat transfer plate 34, the plate member 41 is allowed to come closer to the side surfaces of the cages 36. As a result, it is possible to more efficiently absorb the heat generated from the pluggable modules 37 via the cages 36. As a result, the optical transmission device 10 which improves the heat dissipation efficiency may be achieved.

An exemplary embodiment (variation 4) is related to a variation of a guide pin and an insertion hole of the exemplary embodiment (variation 1). That is, in the exemplary embodiment (variation 1), a guide pin is provided in the heat transfer plate, and an insertion hole is provided in the heat sink. Meanwhile, in the exemplary embodiment (variation 4), a guide pin is provided in the heat sink, and an insertion hole is provided in the heat transfer plate.

[Configuration of Optical Transmission Device]

Figure 32:
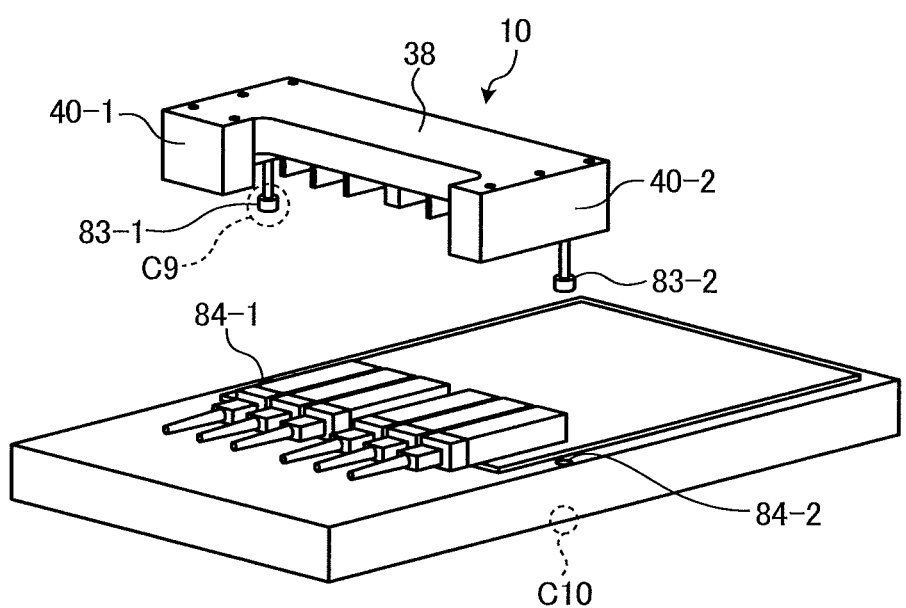
FIG. 32 is a view for explaining a configuration example of an optical transmission device of an exemplary embodiment (variation 4)
Figure 33:
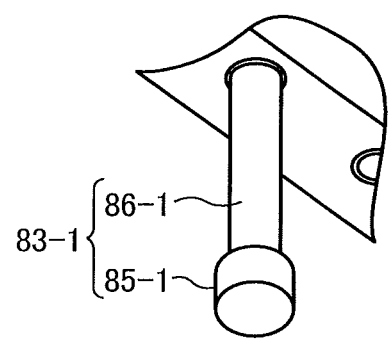
FIG. 33 is a view illustrating a guide pin within a circle C9, in an enlarged scale.

FIG. 32 is a view for explaining a configuration example of an optical transmission device of the exemplary embodiment (variation 4). In FIG. 32, the heat sink 38 includes guide pins 83-1 and 83-2. The guide pin 83-1 is provided to rise from the bottom surface of the pedestal portion 40-1. The guide pin 83-2 is provided to rise from the bottom surface of the pedestal portion 40-2. FIG. 33 is a view illustrating the guide pin 83-1 within a circle C9, in an enlarged scale. As illustrated in FIG. 33, the guide pin 83-1 includes a rod-shaped portion 86-1, and a rod-shaped portion 85-1 having a larger cross-sectional area than the rod-shaped portion 86-1. Although not illustrated, the guide pin 83-2 has the same configuration as that of the guide pin 83-1, and includes a rod-shaped portion 86-2, and a rod-shaped portion 85-2 having a larger cross-sectional area than the rod-shaped portion 86-2.

Figure 34:
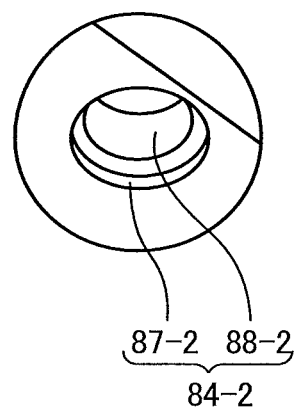
FIG. 34 is a view illustrating an insertion hole within a circle C10, in an enlarged scale.

As illustrated in FIG. 32, insertion holes 84-1 and 84-2 are provided in the heat transfer plate 34 of the exemplary embodiment (variation 4). FIG. 34 is a view illustrating the insertion hole 84-2 within a circle C10, in an enlarged scale. As illustrated in FIG. 34, the insertion hole 84-2 includes a cylindrical portion 88-2 and a cylindrical portion 87-2 having a larger diameter than the cylindrical portion 88-2. Although not illustrated, the insertion hole 84-1 has the same configuration as that of the insertion hole 84-2, and includes a cylindrical portion 88-1, and a cylindrical portion 87-1 having a larger diameter than the cylindrical portion 88-1. The cylindrical portion 87-1 and the cylindrical portion 87-2 accommodate the rod-shaped portion 85-1 and the rod-shaped portion 85-2, respectively, in a state where the guide pins 83-1 and 83-2 are inserted into the insertion holes 84-1 and 84-2, respectively. Here, the diameter of the cylindrical portion 88-1 is substantially the same as or slightly larger than the diameter of the rod-shaped portion 85-1. The diameter of the cylindrical portion 88-2 is substantially the same as or slightly larger than the diameter of the rod-shaped portion 85-2. The diameter of the cylindrical portion 87-1 is larger than the diameter of the rod-shaped portion 85-1. The diameter of the cylindrical portion 87-2 is larger than the diameter of the rod-shaped portion 85-2. In the illustration of FIG. 34, the cylindrical portions 87-1 and 87-2 are opened at the bottom surface of the heat transfer plate 34, but the present disclosure is not limited thereto. The cylindrical portions 87-1 and 87-2 may not be opened.

[Manufacturing Method of Optical Transmission Device]

Figure 35:
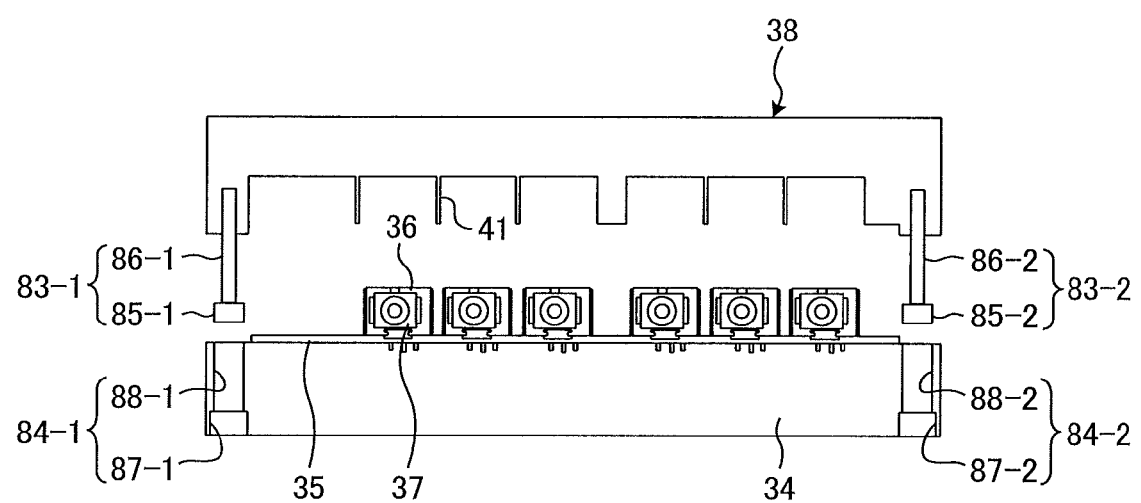
FIG. 35 is a view for explaining a manufacturing method of the optical transmission device of the exemplary embodiment (variation 4)
Figure 36:
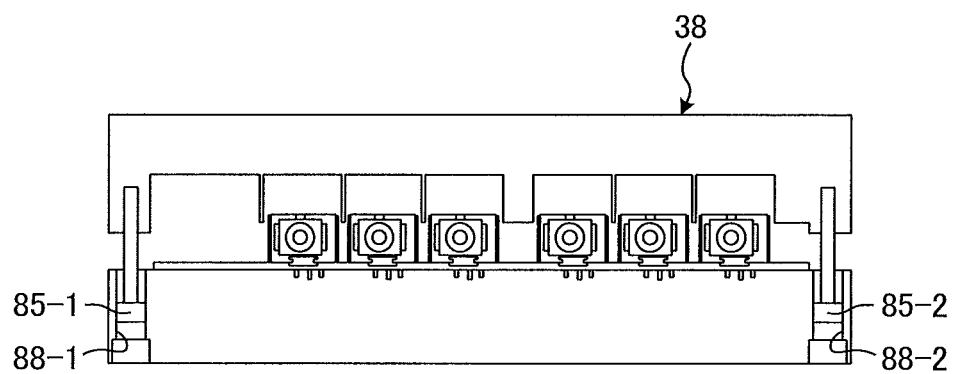
FIG. 36 is a view for explaining the manufacturing method of the optical transmission device of the exemplary embodiment (variation 4)
Figure 37:
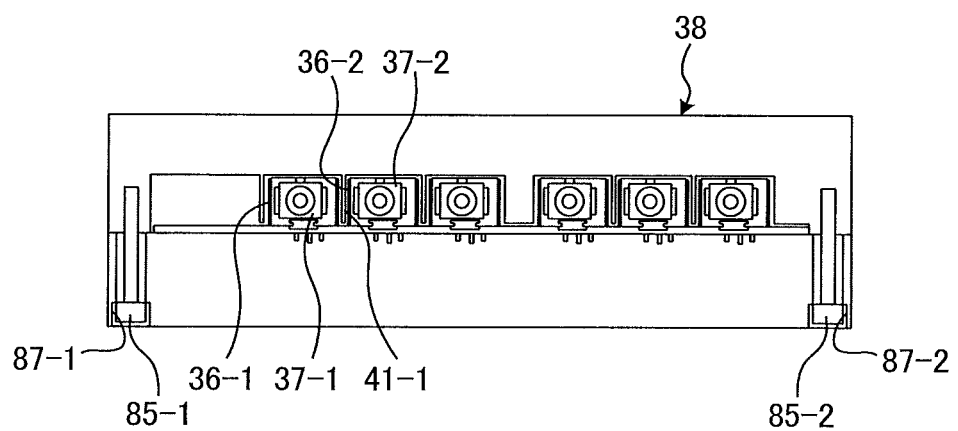
FIG. 37 is a view for explaining the manufacturing method of the optical transmission device of the exemplary embodiment (variation 4)

A manufacturing method of the optical transmission device configured as described above will be described. FIGS. 35 to 37 are views for explaining the manufacturing method of the optical transmission device of the exemplary embodiment (variation 4). Herein, especially, referring to FIGS. 35 to 37, an assembly process of the optical transmission device 10 of the exemplary embodiment (variation 4) will be described.

As illustrated in FIGS. 35 to 37, the guide pins 83-1 and 83-2 are inserted into the insertion holes 84-1 and 84-2, respectively. The guide pins 83-1 and 83-2 are set to be longer than the separation distance from the top surface of the substrate 35 to the top surfaces of the cages 36-1 to 36-6. As described above, the diameter of the cylindrical portion 88-1 is set to be substantially the same as or slightly larger than the diameter of the rod-shaped portion 85-1. The diameter of the cylindrical portion 88-2 is set to be substantially the same as or slightly larger than the diameter of the rod-shaped portion 85-2. Accordingly, since each of the plate members 41-1 to 41-5 may be arranged linearly between two adjacent cages 36 among the cages 36-1 to 36-6 by a guide of the guide pins 83-1 and 83-2, the plate members 41-1 to 41-5 may be avoided from colliding with the cages 36-1 to 36-6.

In this state, in the same manner as in the exemplary embodiment (variation 1), the heat sink 38 is rotated along the top surface of the heat transfer plate 34 (that is, in the plane parallel to the top surface of the heat transfer plate 34). This rotation is enabled by the fact that the diameter of the cylindrical portion 87-1 is larger than the diameter of the rod-shaped portion 85-1, and the diameter of the cylindrical portion 87-2 is larger than the diameter of the rod-shaped portion 85-2. By the rotation, when attention is paid to the cages 36-1 and 36-2 and the plate member 41-1, one end of the plate member 41-1 comes close to the side surface of the cage 36-1, and the other end of the plate member 41-1 comes close to the side surface of the cage 36-2. As a result, the heat sink 38 may further efficiently absorb the heat generated from the pluggable modules 37-1 to 37-6 via the cages 36-1 to 36-6.

As described above, according to the present exemplary embodiment, the optical transmission device 10 includes the guide pins 83-1 and 83-2 provided on the bottom surfaces of the pedestal portions 40-1 and 40-2. In the optical transmission device 10, the insertion holes 84-1 and 84-2 are provided at both end portions of the heat transfer plate 34, respectively. The guide pins 83-1 and 83-2 are inserted into the insertion holes 84-1 and 84-2, respectively. The guide pin 83-1 includes the rod-shaped portion 86-1, and the rod-shaped portion 85-1 having a larger cross-sectional area than the rod-shaped portion 86-1. The guide pin 83-2 includes the rod-shaped portion 86-2, and the rod-shaped portion 85-2 having a larger cross-sectional area than the rod-shaped portion 86-2. The insertion hole 84-1 includes the cylindrical portion 88-1, and the cylindrical portion 87-1 having a larger diameter than the cylindrical portion 88-1. The insertion hole 84-2 includes the cylindrical portion 88-2, and the cylindrical portion 87-2 having a larger diameter than the cylindrical portion 88-2.

Through the configuration of the optical transmission device 10, since the plate member 41 may be arranged linearly between two cages 36 by a guide of the guide pins 83-1 and 83-2, it is possible to avoid positional deviation or damage of the cages 36 due to collision of the heat sink 38. Also, since it becomes possible to rotate the heat sink 38 along the top surface of the heat transfer plate 34, the plate member 41 is allowed to come closer to the side surfaces of the cages 36. As a result, it is possible to more efficiently absorb the heat generated from the pluggable modules 37 via the cages 36. As a result, the optical transmission device 10 which improves the heat dissipation efficiency may be achieved.

An exemplary embodiment (variation 5) is related to a variation of a guide pin and an insertion hole of the exemplary embodiment (variation 2). That is, in the exemplary embodiment (variation 2), a guide pin is provided in the heat transfer plate, and an insertion hole is provided in the heat sink. Meanwhile, in the exemplary embodiment (variation 5), like in the exemplary embodiment (variation 4), a guide pin is provided in the heat sink, and an insertion hole is provided in the heat transfer plate.

[Configuration of Optical Transmission Device]

Figure 38:
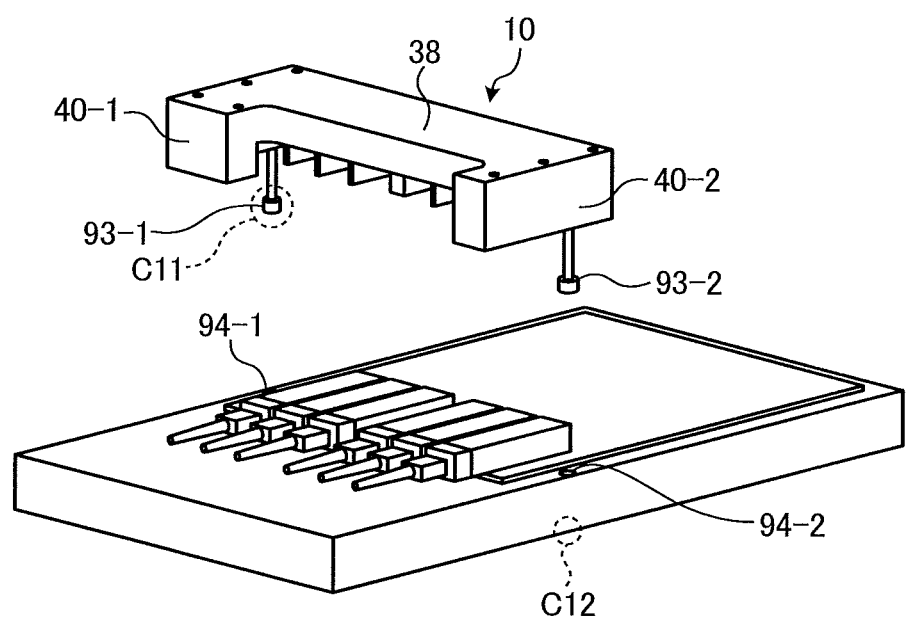
FIG. 38 is a view for explaining a configuration example of an optical transmission device of an exemplary embodiment (variation 5)

FIG. 38 is a view for explaining a configuration example of an optical transmission device of the exemplary embodiment (variation 5).

Figure 39:
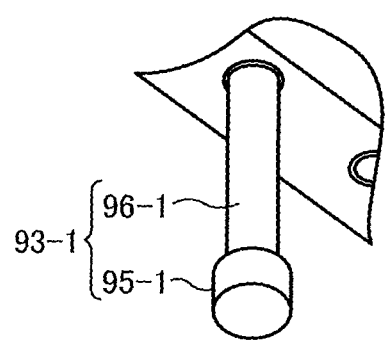
FIG. 39 is a view illustrating a guide pin within a circle C11, in an enlarged scale.

As illustrated in FIG. 38, the optical transmission device 10 of the exemplary embodiment (variation 5) includes guide pins 93-1 and 93-2. FIG. 39 is a view illustrating the guide pin 93-1 within a circle C11, in an enlarged scale. As illustrated in FIG. 39, the guide pin 93-1 includes a rod-shaped portion 96-1, and a rod-shaped portion 95-1 having a larger cross-sectional area than the rod-shaped portion 96-1. Although not illustrated, the guide pin 93-2 has the same configuration as that of the guide pin 93-1, and includes a rod-shaped portion 96-2, and a rod-shaped portion 95-2 having a larger cross-sectional area than the rod-shaped portion 96-2.

Figure 40:
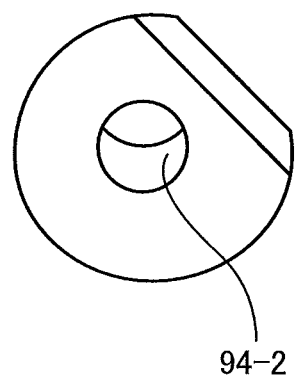
FIG. 40 is a view illustrating an insertion hole within a circle C12, in an enlarged scale.

As illustrated in FIG. 38, insertion holes 94-1 and 94-2 are provided in the heat transfer plate 34 of the exemplary embodiment (variation 5). FIG. 40 is a view illustrating the insertion hole 94-2 within a circle C12, in an enlarged scale. As illustrated in FIG. 40, the insertion hole 94-2 is formed into a cylindrical shape having a fixed diameter. Although not illustrated, the insertion hole 94-1 has the same configuration as that of the insertion hole 94-2. Here, the diameter of the insertion hole 94-1 is substantially the same as or slightly larger than the diameter of the rod-shaped portion 95-1. The diameter of the insertion hole 94-2 is substantially the same as or slightly larger than the diameter of the rod-shaped portion 95-2. The diameter of the insertion hole 94-1 is larger than the diameter of the rod-shaped portion 96-1. The diameter of the insertion hole 94-2 is larger than the diameter of the rod-shaped portion 96-2.

[Manufacturing Method of Optical Transmission Device]

Figure 41:
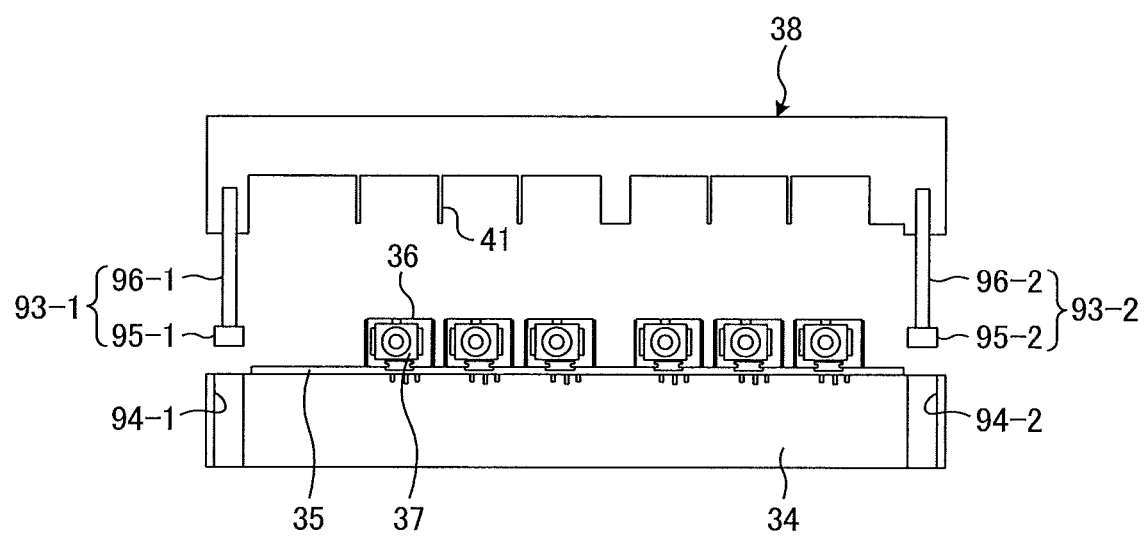
FIG. 41 is a view for explaining a manufacturing method of the optical transmission device of the exemplary embodiment (variation 5)
Figure 42:
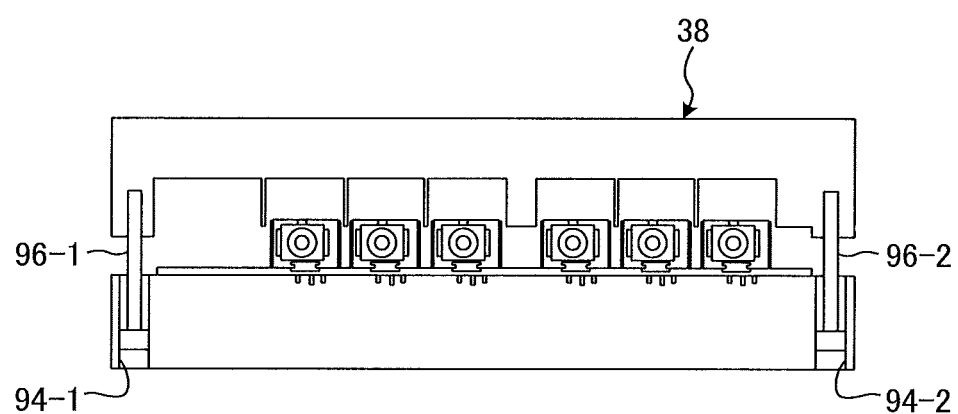
FIG. 42 is a view for explaining the manufacturing method of the optical transmission device of the exemplary embodiment (variation 5)
Figure 43:
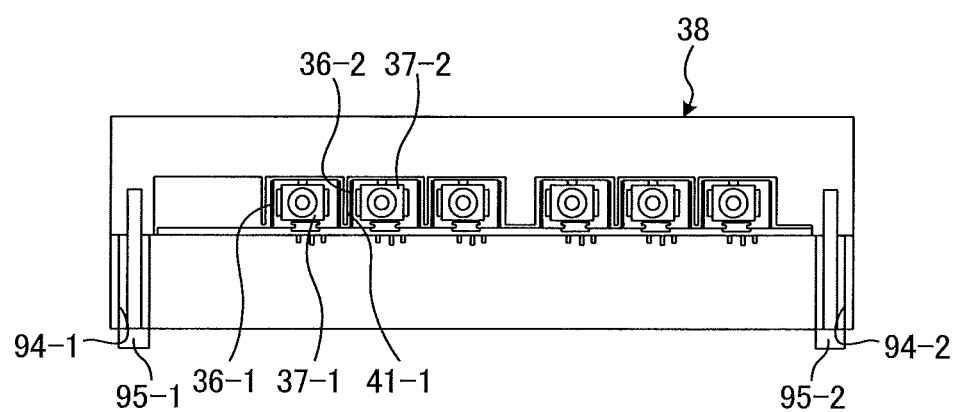
FIG. 43 is a view for explaining the manufacturing method of the optical transmission device of the exemplary embodiment (variation 5)

A manufacturing method of the optical transmission device configured as described above will be described. FIGS. 41 to 43 are views for explaining the manufacturing method of the optical transmission device of the exemplary embodiment (variation 5). Herein, especially, referring to FIGS. 41 to 43, an assembly process of the optical transmission device 10 of the exemplary embodiment (variation 5) will be described.

As illustrated in FIGS. 41 to 43, the guide pins 93-1 and 93-2 are inserted into the insertion holes 94-1 and 94-2, respectively. The guide pins 93-1 and 93-2 are set to be longer than the separation distance from the top surface of the substrate 35 to the top surfaces of the cages 36-1 to 36-6. As described above, the diameter of the insertion hole 94-1 is set to be substantially the same as or slightly larger than the diameter of the rod-shaped portion 95-1. The diameter of the insertion hole 94-2 is set to be substantially the same as or slightly larger than the diameter of the rod-shaped portion 95-2. Accordingly, since each of the plate members 41-1 to 41-5 may be arranged linearly between two adjacent cages 36 among the cages 36-1 to 36-6 by a guide of the guide pins 93-1 and 93-2, the plate members 41-1 to 41-5 may be avoided from colliding with the cages 36-1 to 36-6. The length of the guide pin 93-1 is longer than the thickness of the heat transfer plate 34, and the length of the guide pin 93-2 is longer than the thickness of the heat transfer plate 34. Accordingly, as illustrated in FIG. 43, the rod-shaped portion 95-1 and the rod-shaped portion 95-2 protrude from the insertion hole 94-1 and the insertion hole 94-2.

In this state, in the same manner as in the exemplary embodiment (variation 2), the heat sink 38 is rotated along the top surface of the heat transfer plate 34 (that is, in the plane parallel to the top surface of the heat transfer plate 34). This rotation is enabled by the fact that the rod-shaped portions 95-1 and 95-2 protrude from the insertion holes 94-1 and 94-2, the diameter of the insertion hole 94-1 is larger than the diameter of the rod-shaped portion 95-1, and the diameter of the insertion hole 94-2 is larger than the diameter of the rod-shaped portion 95-2. By the rotation, when attention is paid to the cages 36-1 and 36-2 and the plate member 41-1, one end of the plate member 41-1 comes close to the side surface of the cage 36-1, and the other end of the plate member 41-1 comes close to the side surface of the cage 36-2. As a result, the heat sink 38 may further efficiently absorb the heat generated from the pluggable modules 37-1 to 37-6 via the cages 36-1 to 36-6.

As described above, according to the present exemplary embodiment, the optical transmission device 10 includes the guide pins 93-1 and 93-2 provided on the bottom surfaces of the pedestal portions 40-1 and 40-2. In the optical transmission device 10, the insertion holes 94-1 and 94-2 are provided at both end portions of the heat transfer plate 34, respectively. The guide pins 93-1 and 93-2 are inserted into the insertion holes 94-1 and 94-2, respectively. The guide pin 93-1 includes the rod-shaped portion 96-1, and the rod-shaped portion 95-1 having a larger cross-sectional area than the rod-shaped portion 96-1. The guide pin 93-2 includes the rod-shaped portion 96-2, and the rod-shaped portion 95-2 having a larger cross-sectional area than the rod-shaped portion 96-2. Each of the insertion holes 94-1 and 94-2 is formed into a cylindrical shape having a fixed diameter. The length of the guide pin 93-1 is longer than the thickness of the heat transfer plate 34, and the length of the guide pin 93-2 is longer than the thickness of the heat transfer plate 34.

Through the configuration of the optical transmission device 10, since the plate member 41 may be arranged linearly between two cages 36 by a guide of the guide pins 93-1 and 93-2, it is possible to avoid positional deviation or damage of the cages 36 due to collision of the heat sink 38. Also, since it becomes possible to rotate the heat sink 38 along the top surface of the heat transfer plate 34, the plate member 41 is allowed to come closer to the side surfaces of the cages 36. As a result, it is possible to more efficiently absorb the heat generated from the pluggable modules 37 via the cages 36. As a result, the optical transmission device 10 which improves the heat dissipation efficiency may be achieved.

An exemplary embodiment (variation 6) is related to a variation of a guide pin and an insertion hole of the exemplary embodiment (variation 3). That is, in the exemplary embodiment (variation 3), a guide pin is provided in the heat transfer plate, and an insertion hole is provided in the heat sink. Meanwhile, in the exemplary embodiment (variation 6), like in the exemplary embodiment (variation 4), a guide pin is provided in the heat sink, and an insertion hole is provided in the heat transfer plate.

[Configuration of Optical Transmission Device]

Figure 44:
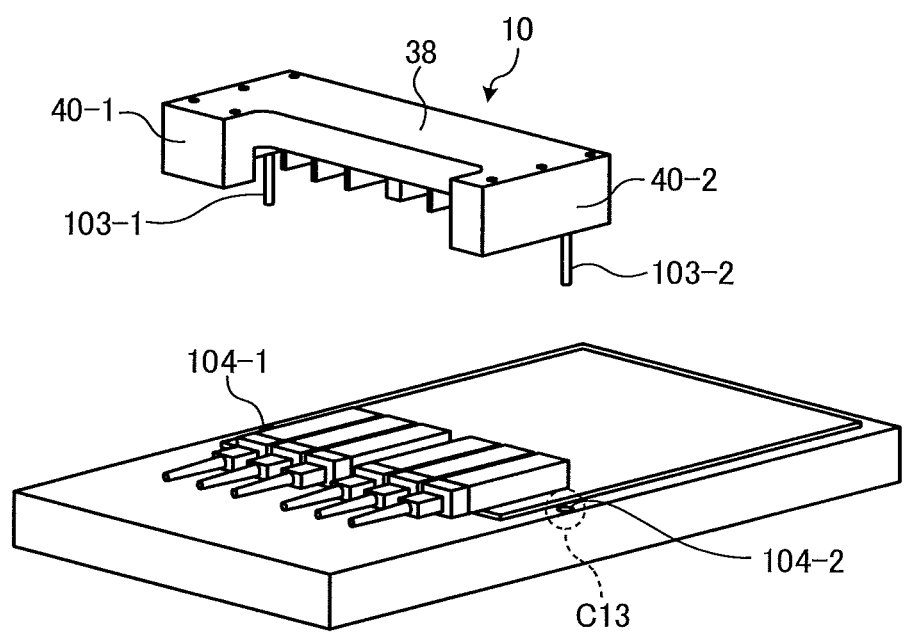
FIG. 44 is a view for explaining a configuration example of an optical transmission device of an exemplary embodiment (variation 6)

FIG. 44 is a view for explaining a configuration example of an optical transmission device of the exemplary embodiment (variation 6).

As illustrated in FIG. 44, the optical transmission device 10 of the exemplary embodiment (variation 6) includes guide pins 103-1 and 103-2. Each of the guide pins 103-1 and 103-2 is formed into a rod shape having a fixed diameter.

Figure 45:
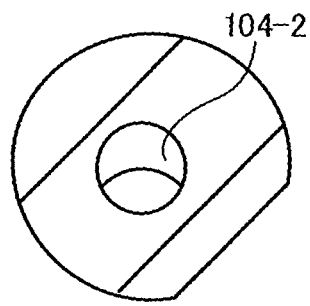
FIG. 45 is a view illustrating an insertion hole within a circle C13, in an enlarged scale.

As illustrated in FIG. 44, insertion holes 104-1 and 104-2 are provided in the heat transfer plate 34 of the exemplary embodiment (variation 6). FIG. 45 is a view illustrating the insertion hole 104-2 within a circle C13, in an enlarged scale. As illustrated in FIG. 45, the insertion hole 104-2 is formed into a cylindrical shape having a fixed diameter. Although not illustrated, the insertion hole 104-1 has the same configuration as that of the insertion hole 104-2. Here, the diameter of the insertion hole 104-1 is larger than the diameter of the guide pin 103-1. Also, the diameter of the insertion hole 104-2 is larger than the diameter of the guide pin 103-2.

[Manufacturing Method of Optical Transmission Device]

A manufacturing method of the optical transmission device configured as described above will be described. FIGS. 46 to 49 are views for explaining the manufacturing method of the optical transmission device of the exemplary embodiment (variation 6). Herein, especially, referring to FIGS. 46 to 49, an assembly process of the optical transmission device 10 of the exemplary embodiment (variation 6) will be described.

Figure 46:
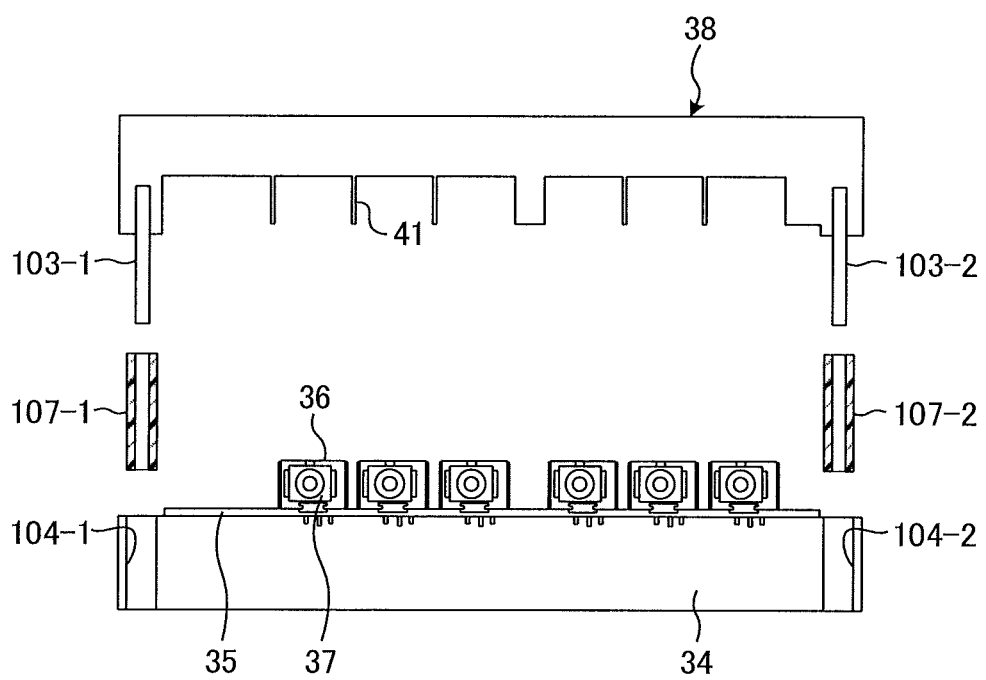
FIG. 46 is a view for explaining a manufacturing method of the optical transmission device of the exemplary embodiment (variation 6)
Figure 47:
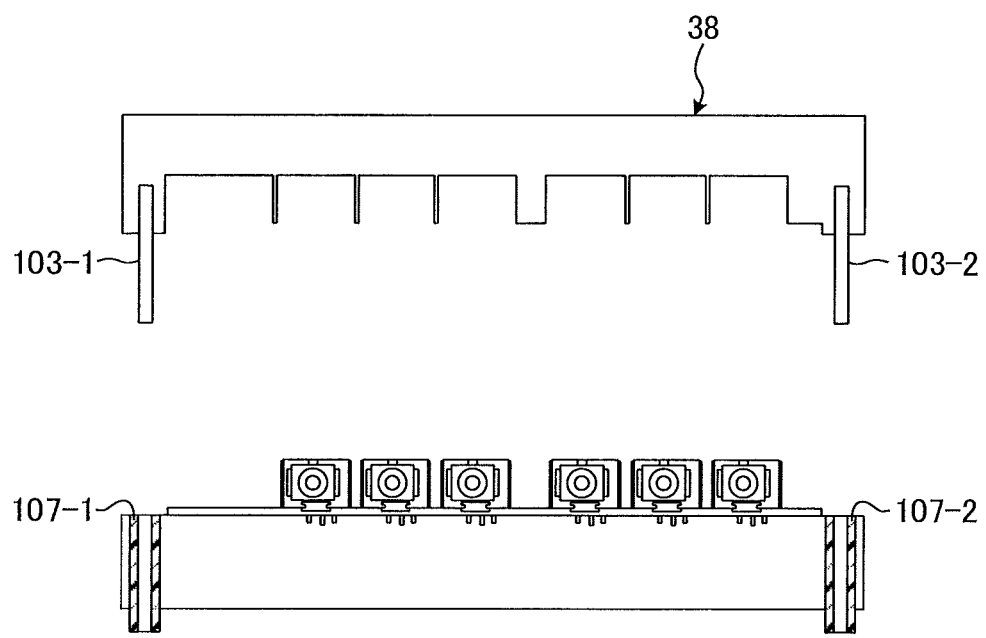
FIG. 47 is a view for explaining the manufacturing method of the optical transmission device of the exemplary embodiment (variation 6)

As illustrated in FIGS. 46 and 47, tubular sleeves 107-1 and 107-2 are fitted in the insertion holes 104-1 and 104-2, respectively. The outer diameter of the sleeve 107-1 is substantially the same as or slightly smaller than the diameter of the insertion hole 104-1. The outer diameter of the sleeve 107-2 is substantially the same as or slightly smaller than the diameter of the insertion hole 104-2.

Figure 48:
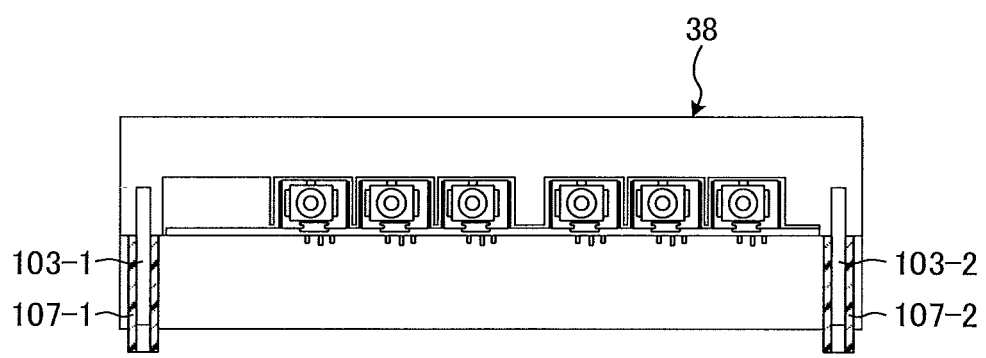
FIG. 48 is a view for explaining the manufacturing method of the optical transmission device of the exemplary embodiment (variation 6)

In this state, as illustrated in FIG. 48, the guide pins 103-1 and 103-2 are inserted into the hollow portion of the sleeve 107-1 and the hollow portion of the sleeve 107-2, respectively. The inner diameter of the sleeve 107-1 is substantially the same as or slightly larger than the diameter of the guide pin 103-1. The inner diameter of the sleeve 107-2 is substantially the same as or slightly larger than the diameter of the guide pin 103-2. Accordingly, since each of the plate members 41-1 to 41-5 may be arranged linearly between two adjacent cages 36 among the cages 36-1 to 36-6 by a guide of the guide pins 103-1 and 103-2 and the sleeves 107-1 and 107-2, the plate members 41-1 to 41-5 may be avoided from colliding with the cages 36-1 to 36-6.

Figure 49:
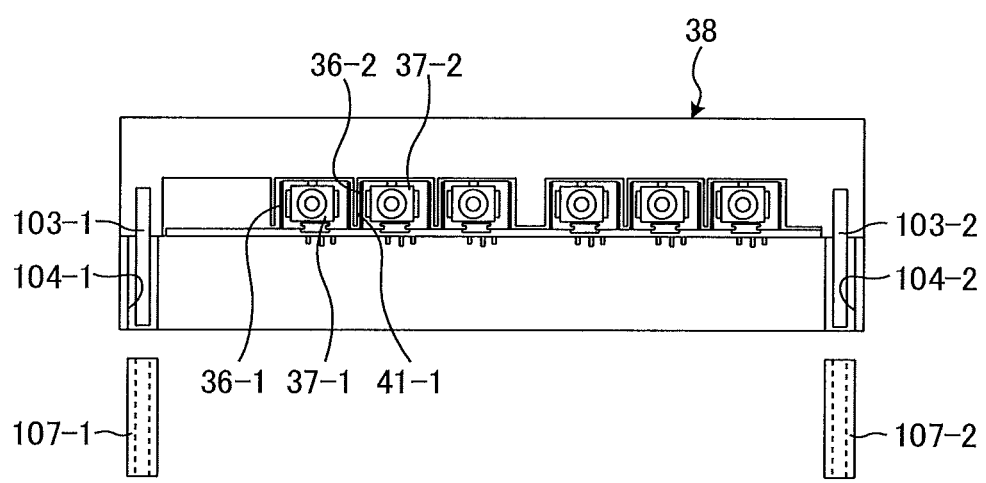
FIG. 49 is a view for explaining the manufacturing method of the optical transmission device of the exemplary embodiment (variation 6)

In this state, as illustrated in FIG. 49, the sleeves 107-1 and 107-2 are pulled out.

Then, in the same manner as in the exemplary embodiment (variation 3), the heat sink 38 is rotated along the top surface of the heat transfer plate 34 (that is, in the plane parallel to the top surface of the heat transfer plate 34). This rotation is enabled by the fact that the diameter of the insertion hole 104-1 is larger than the diameter of the guide pin 103-1, and the diameter of the insertion hole 104-2 is larger than the diameter of the guide pin 103-2. By the rotation, when attention is paid to the cages 36-1 and 36-2 and the plate member 41-1, one end of the plate member 41-1 comes close to the side surface of the cage 36-1, and the other end of the plate member 41-1 comes close to the side surface of the cage 36-2. As a result, the heat sink 38 may further efficiently absorb the heat generated from the pluggable modules 37-1 to 37-6 via the cages 36-1 to 36-6.

As described above, according to the present exemplary embodiment, the optical transmission device 10 includes the guide pins 103-1 and 103-2 provided on the bottom surfaces of the pedestal portions 40-1 and 40-2. In the optical transmission device 10, the insertion holes 104-1 and 104-2 are provided at both end portions of the heat transfer plate 34, respectively. The guide pins 103-1 and 103-2 are inserted into the insertion holes 104-1 and 104-2, respectively. The guide pins 103-1 and 103-2 are longer than the separation distance from the top surface of the substrate 35 to the top surfaces of the cages 36. The diameter of the insertion hole 104-1 is larger than the diameter of the guide pin 103-1, and the diameter of the insertion hole 104-2 is larger than the diameter of the guide pin 103-2.

Through the configuration of the optical transmission device 10, since the plate member 41 may be arranged linearly between two cages 36 by a guide of the guide pins 103-1 and 103-2, it is possible to avoid positional deviation or damage of the cages 36 due to collision of the heat sink 38. Also, since it becomes possible to rotate the heat sink 38 along the top surface of the heat transfer plate 34, the plate member 41 is allowed to come closer to the side surfaces of the cages 36. As a result, it is possible to more efficiently absorb the heat generated from the pluggable modules 37 via the cages 36. As a result, the optical transmission device 10 which improves the heat dissipation efficiency may be achieved.

An exemplary embodiment (variation 7) is related to a variation of a guide pin and a plate member of the exemplary embodiment.

[Configuration of Optical Transmission Device]

FIGS. 50 to 53 are views for explaining the configuration example of the optical transmission device of the exemplary embodiment (variation 7).

Figure 50:
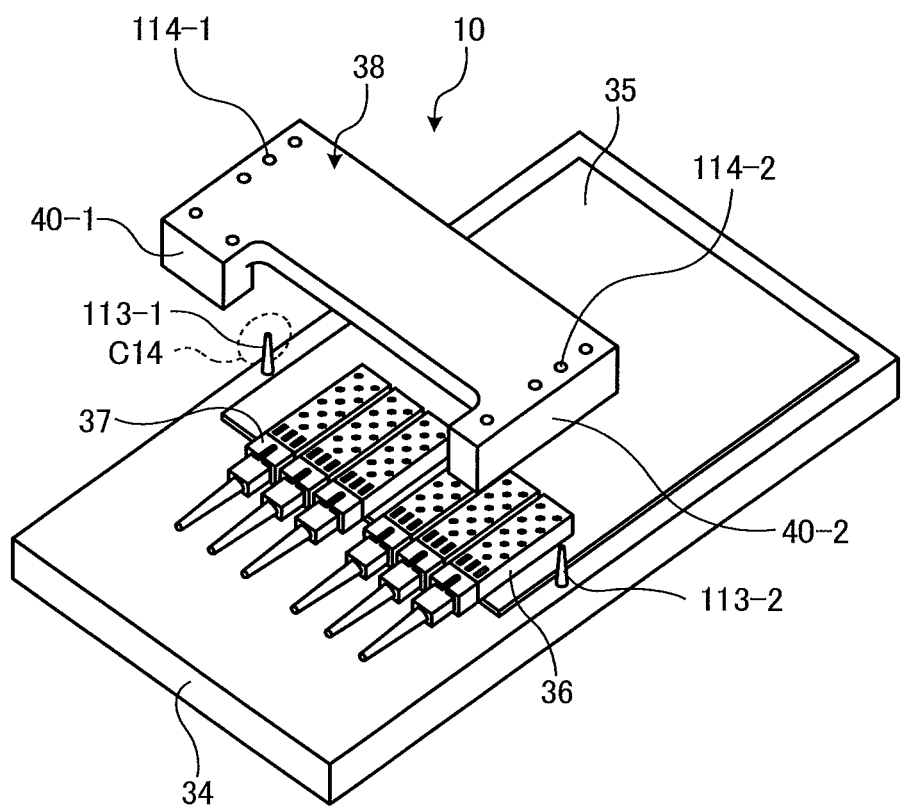
FIG. 50 is a view for explaining a configuration example of an optical transmission device of an exemplary embodiment (variation 7)
Figure 51:
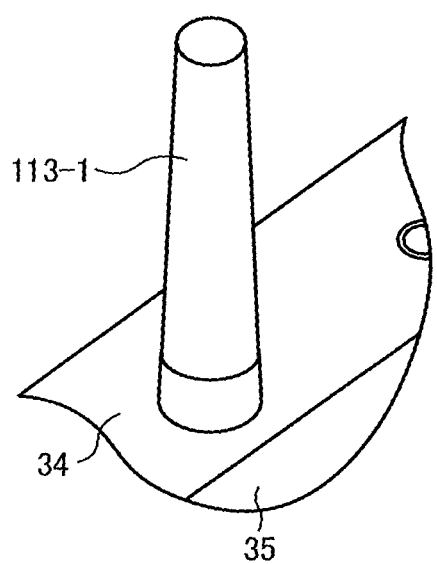
FIG. 51 is a view for explaining the configuration example of the optical transmission device of the exemplary embodiment (variation 7)

As illustrated in FIG. 50, the optical transmission device 10 of the exemplary embodiment (variation 7) includes guide pins 113-1 and 113-2. FIG. 51 is a view illustrating the guide pin 113-1 within a circle C14, in an enlarged scale. As illustrated in FIG. 51, the guide pin 113-1 has a shape having a cross-sectional area which decreases from a root (that is, the top surface side of the heat transfer plate 34) toward the distal end. That is, the guide pin 113-1 is formed into a tapered shape. Although not illustrated, the guide pin 113-2 has the same configuration as that of the guide pin 113-1.

As illustrated in FIG. 50, insertion holes 114-1 and 114-2 are provided in the heat sink 38 of the exemplary embodiment (variation 7). Each of the insertion holes 114-1 and 114-2 is formed into a cylindrical shape having a fixed diameter. Here, the diameter of the insertion hole 114-1 is substantially the same as or slightly larger than the diameter of the root portion of the guide pin 113-1. Also, the diameter of the insertion hole 114-2 is substantially the same as or slightly larger than the diameter of the root portion of the guide pin 113-2.

Figure 52:
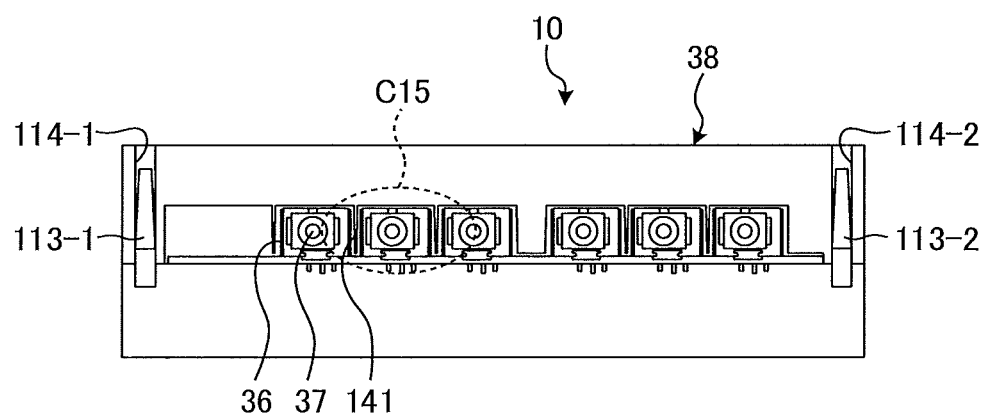
FIG. 52 is a view for explaining the configuration example of the optical transmission device of the exemplary embodiment (variation 7)
Figure 53:
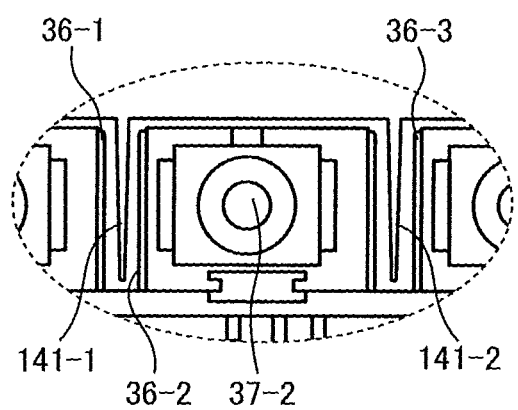
FIG. 53 is a view for explaining the configuration example of the optical transmission device of the exemplary embodiment (variation 7)

As illustrated in FIG. 52, the heat sink 38 of the exemplary embodiment (variation 7) includes plate members 141. Each of the plate members 141 is provided to rise from the bottom surface of the main body 39 which faces the top surface of the substrate 35. As illustrated in FIG. 53, the plate member 141 has a shape having a cross-sectional area which decreases from a root (that is, the bottom surface side of the main body 39) toward the distal end. That is, the plate member 141 is formed into a tapered shape. FIG. 53 is a view illustrating a portion within a circle C15 in FIG. 52, in an enlarged scale.

[Manufacturing Method of Optical Transmission Device]

Figure 54:
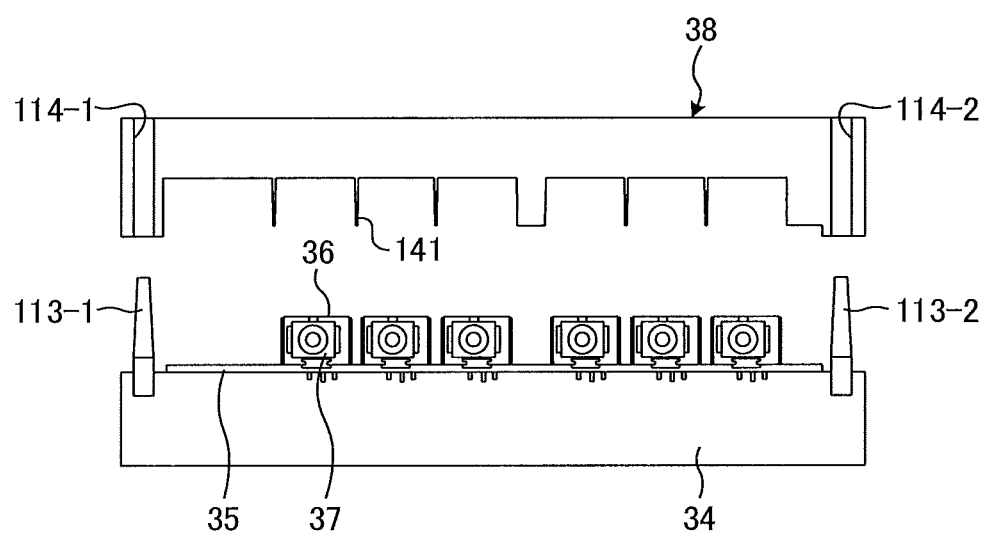
FIG. 54 is a view for explaining a manufacturing method of the optical transmission device of the exemplary embodiment (variation 7)
Figure 55:
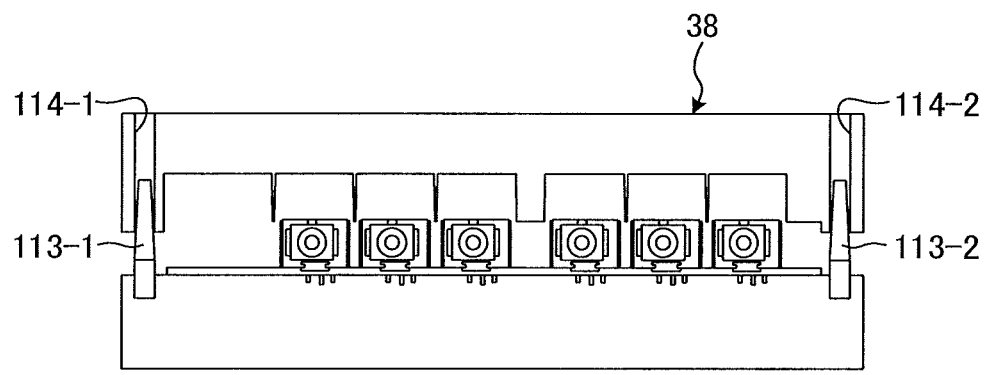
FIG. 55 is a view for explaining the manufacturing method of the optical transmission device of the exemplary embodiment (variation 7)
Figure 56:
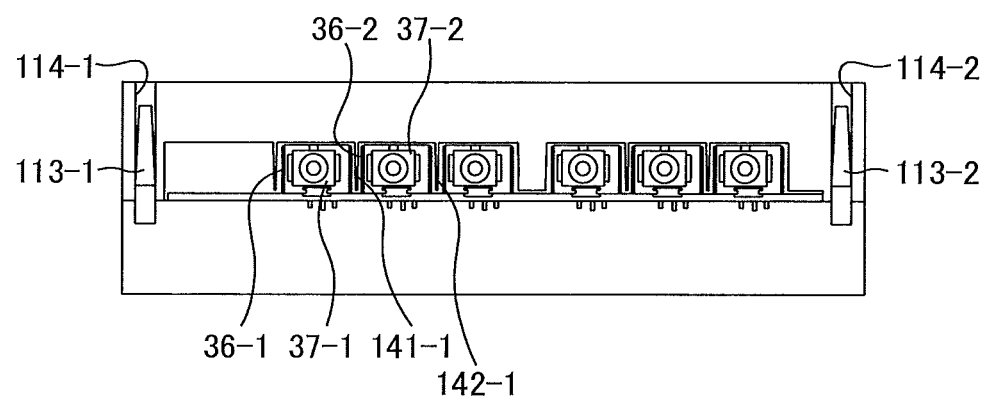
FIG. 56 is a view for explaining the manufacturing method of the optical transmission device of the exemplary embodiment (variation 7)

A manufacturing method of the optical transmission device configured as described above will be described. FIGS. 54 to 56 are views for explaining the manufacturing method of the optical transmission device of the exemplary embodiment (variation 7). Herein, especially, referring to FIGS. 54 to 56, an assembly process of the optical transmission device 10 will be described.

As illustrated in FIGS. 54 and 55, the distal ends of the guide pins 113-1 and 113-2 are gradually inserted into the insertion holes 114-1 and 114-2. Here, as described above, since each of the distal ends of the guide pins 113-1 and 113-2 is tapered, the distal ends of the guide pins 113-1 and 113-2 may be easily inserted into the insertion holes 114-1 and 114-2. Meanwhile, since each of the distal ends of the guide pins 113-1 and 113-2 is tapered, the heat sink 38 may be laterally deviated. On the other hand, as described above, the distal end of the plate member 141 is tapered, and thus may be avoided from colliding with the cages 36.

As illustrated in FIG. 56, the guide pins 113-1 and 113-2, including the roots thereof, are inserted into the insertion holes 114-1 and 114-2. As described above, the diameter of the insertion hole 114-1 is substantially the same as or slightly larger than the diameter of the root portion of the guide pin 113-1. Also, the diameter of the insertion hole 114-2 is substantially the same as or slightly larger than the diameter of the root portion of the guide pin 113-2. Accordingly, since the plate member 141 may be arranged linearly between two adjacent cages 36 by a guide of the guide pins 113-1 and 113-2, the cross-sectional area of the root portion of the plate member 141 may be large, and the plate member 141 may be avoided from colliding with the cages 36.

As described above, according to the present exemplary embodiment, the optical transmission device 10 includes the heat sink 38 which has the plate member 141 arranged between two adjacent cages 36. The plate member 141 is formed into a tapered shape. The optical transmission device 10 includes the guide pins 113-1 and 113-2 provided at both end portions of the heat transfer plate 34. Each of the guide pins 113-1 and 113-2 is formed into a tapered shape. In the optical transmission device 10, the insertion holes 114-1 and 114-2 are provided in the pedestal portions 40-1 and 40-2, respectively. The guide pins 113-1 and 113-2 are inserted into the insertion holes 114-1 and 114-2, respectively. The guide pins 113-1 and 113-2 are longer than the separation distance from the top surface of the substrate 35 to the top surfaces of the cages 36.

Through this configuration, the distal ends of the guide pins 113-1 and 113-2 may be easily inserted into the insertion holes 114-1 and 114-2. Through the configuration, since the plate member 141 may be arranged linearly between two cages 36 by a guide of the guide pins 113-1 and 113-2, it is possible to avoid positional deviation or damage of the cages 36 due to collision of the heat sink 38.

In the above description, the guide pins are provided in the heat transfer plate, and the insertion holes are provided in the heat sink, but on the contrary, the guide pins may be provided in the heat sink, and the insertion holes may be provided in the heat transfer plate. Also, the plate member formed into a tapered shape may be employed in the exemplary embodiments (variations 1 to 7).

In the exemplary embodiments (variations 1 to 7), the optical transmission device includes one heat sink. On the contrary, in an exemplary embodiment (variation 8), the optical transmission device includes a first heat sink and a second heat sink.

[Configuration of Optical Transmission Device]

Figure 57:
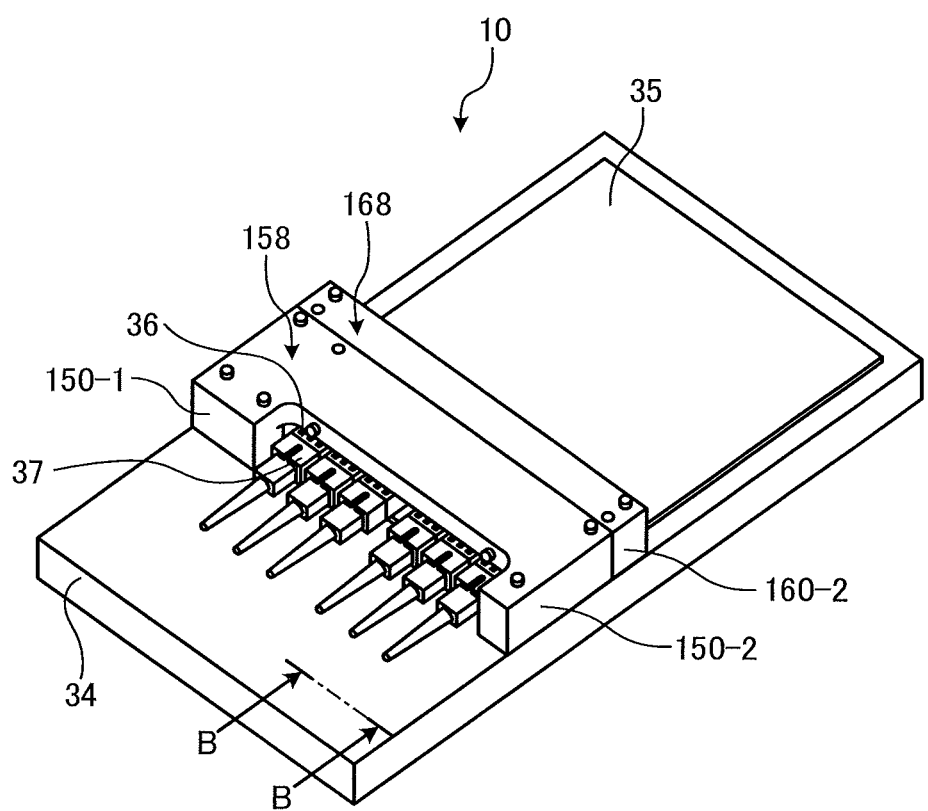
FIG. 57 is a view for explaining a configuration example of an optical transmission device of an exemplary embodiment (variation 8)

FIG. 57 is a view for explaining a configuration example of an optical transmission device of the exemplary embodiment (variation 8). In FIG. 57, the optical transmission device 10 of the exemplary embodiment (variation 8) includes a heat sink 158 as a first heat sink, and a heat sink 168 as a second heat sink.

Figure 58:
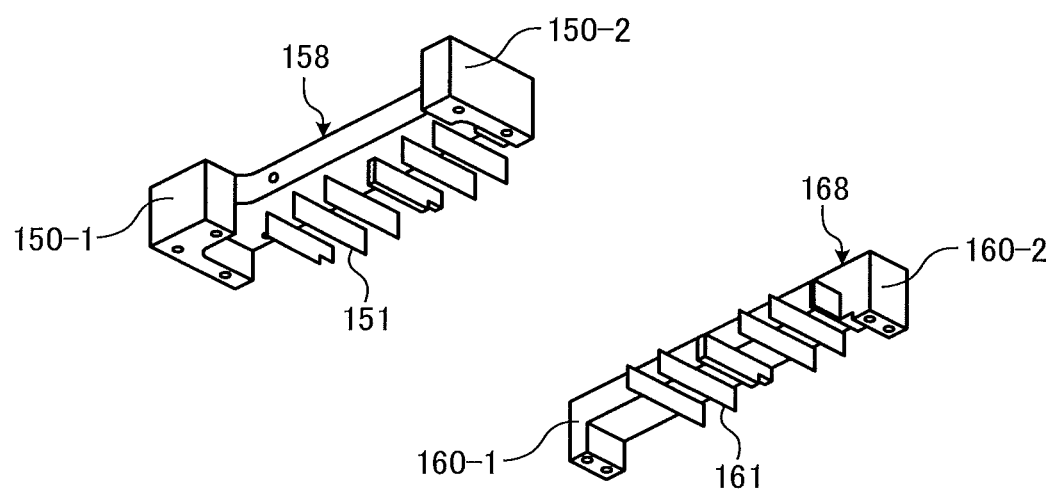
FIG. 58 is a view for explaining a configuration example of a first heat sink and a second heat sink of the exemplary embodiment (variation 8)

FIG. 58 is a view for explaining a configuration example of a first heat sink and a second heat sink of the exemplary embodiment (variation 8). As illustrated in FIG. 58, the heat sink 158 includes pedestal portions 150-1 and 150-2, and plate members 151. Like the plate member 41 of the exemplary embodiment, the plate member 151 is provided to rise from the bottom surface of the main body of the heat sink 158. Also, the plate member 151 includes a portion protruding from the main body of the heat sink 158 toward the heat sink 168 side.

As illustrated in FIG. 58, the heat sink 168 includes pedestal portions 160-1 and 160-2, and plate members 161. Like the plate member 41 of the exemplary embodiment, the plate member 161 is provided to rise from the bottom surface of the main body of the heat sink 168. Also, the plate member 161 includes a portion protruding from the main body of the heat sink 168 toward the heat sink 158 side.

Figure 59:
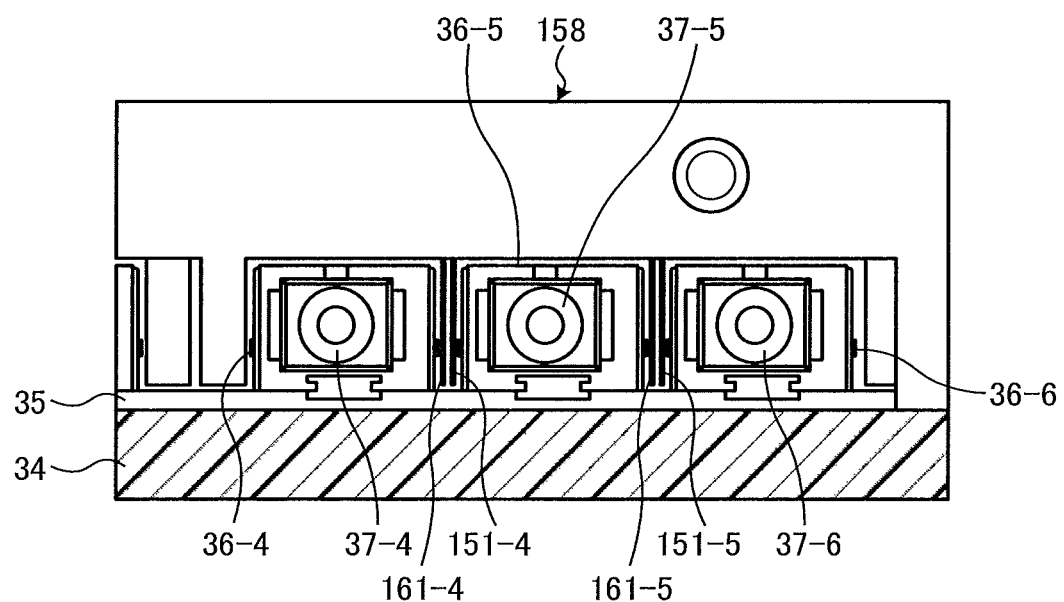
FIG. 59 is a cross-sectional view along the arrow B-B of FIG. 57.

The pedestal portions 150-1 and 150-2 are arranged so that the bottom surfaces of the pedestal portions 150-1 and 150-2 are abutted on both end portions of the heat transfer plate 34. In this state, as illustrated in FIG. 59, the plate member 151 is arranged between two adjacent cages 36. FIG. 59 is a cross-sectional view along the arrow B-B of FIG. 57. Also, the pedestal portions 160-1 and 160-2 are arranged so that the bottom surfaces of the pedestal portions 160-1 and 160-2 are abutted on both end portions of the heat transfer plate 34. In this state, as illustrated in FIG. 59, the plate member 161 is arranged between two adjacent cages 36. Here, the protruding portion of the plate member 151 gets under the main body of the heat sink 168. Also, the protruding portion of the plate member 161 gets under the main body of the heat sink 158. The plate member 151 is arranged to come close to one side of the two adjacent cages 36, and the plate member 161 is arranged to come close to the other side. That is, when attention is paid to the plate member 151-4 and the plate member 161-4, the plate member 151-4 is arranged to come close to the cage 36-5 side, and the plate member 161-4 is arranged to come close to the cage 36-4 side. Accordingly, since the plate member 151 and the plate member 161 may be disposed to come close to the side surfaces of the cages 36, the heat dissipation efficiency in the optical transmission device 10 may be improved.

[Manufacturing Method of Optical Transmission Device]

A manufacturing method of the optical transmission device configured as described above will be described. FIGS. 60 to 63 are views for explaining the manufacturing method of the optical transmission device of the exemplary embodiment (variation 8). Herein, especially, referring to FIGS. 60 to 63, an assembly process of the optical transmission device 10 of the exemplary embodiment (variation 8) will be described.

Figure 60:
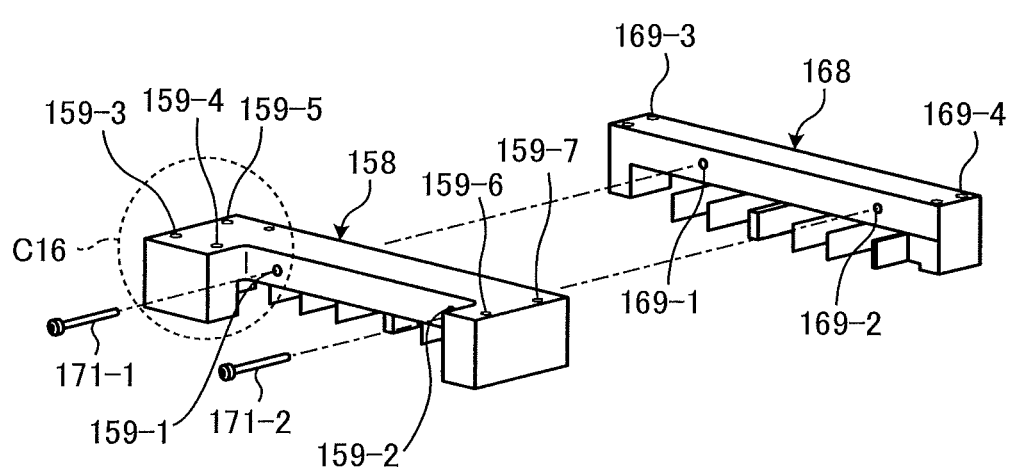
FIG. 60 is a view for explaining a manufacturing method of the optical transmission device of the exemplary embodiment (variation 8)
Figure 61:
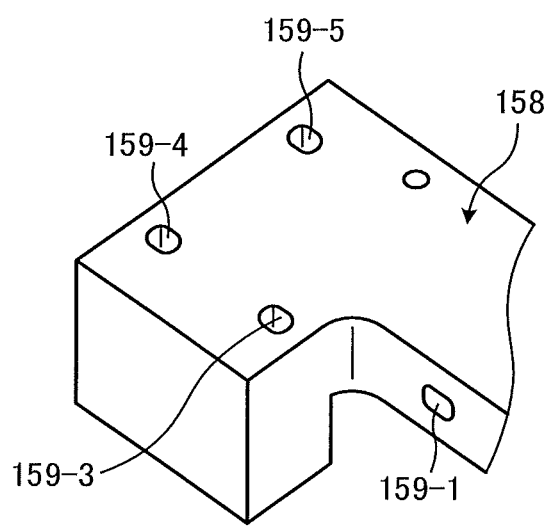
FIG. 61 is a view for explaining the manufacturing method of the optical transmission device of the exemplary embodiment (variation 8)

As illustrated in FIG. 60, bolt holes 159-1 and 159-2 are provided at the side surface of the main body of the heat sink 158. Bolt holes 159-3 to 159-5 are provided at one end portion of the main body of the heat sink 158, and bolt holes 159-6 and 159-7 are provided at the other end portion. Bolt holes 169-1 and 169-2 are provided at the side surface of the main body of the heat sink 168. A bolt hole 169-3 is provided at one end portion of the main body of the heat sink 168, and a bolt hole 169-4 is provided at the other end portion. FIG. 61 is a view illustrating a portion within a circle C16 of FIG. 60 in an enlarged scale. As illustrated in FIG. 61, each of the bolt holes 159-1, and 159-3 to 159-5 is formed into, for example, a shape including a combination of a rectangle and two semicircles whose diameters are two opposite sides of the rectangle, respectively, or an oval shape. This shape is common in all of the bolt holes 159 and the bolt holes 169.

Figure 62:
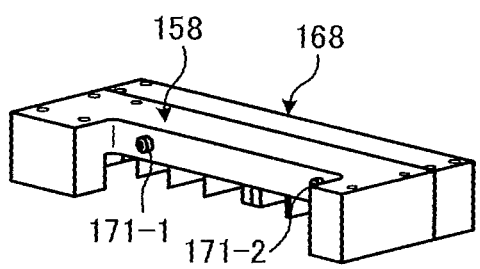
FIG. 62 is a view for explaining the manufacturing method of the optical transmission device of the exemplary embodiment (variation 8)

Then, as illustrated in FIGS. 60 and 62, a bolt 171-1 is inserted into the bolt hole 159-1 and the bolt hole 169-1, and a bolt 171-2 is inserted into the bolt hole 159-2 and the bolt hole 169-2, thereby coupling the heat sink 158 with the heat sink 168. In this state, the plate member 151 and the plate member 161 arranged between two same cages 36 are placed in a state where one side surfaces of the plate member 151 and the plate member 161 are in almost contact with each other.

Figure 63:
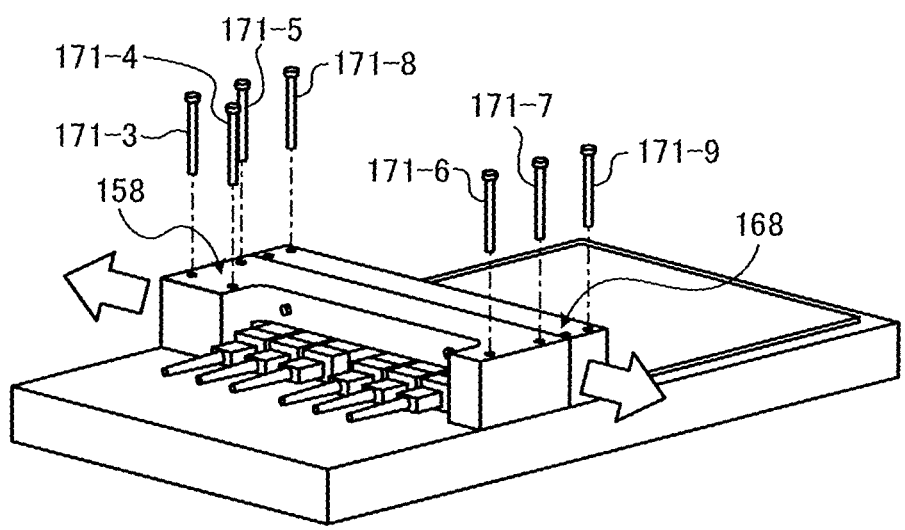
FIG. 63 is a view for explaining the manufacturing method of the optical transmission device of the exemplary embodiment (variation 8)

In this state, as illustrated in FIG. 63, the assembly of the heat sink 158 and the heat sink 168 is arranged so that a pair of the plate member 151 and the plate member 161 whose one side surfaces are in almost contact with each other is located between two adjacent cages 36. Then, bolts 171-3 to 171-9 are inserted into the bolt holes 159-3 to 159-7 and the bolt holes 169-3 and 169-4, respectively.

In this state, the heat sink 158 and the heat sink 168 are slid in the directions of the arrows in FIG. 63, respectively. The sliding is enabled by the fact that the bolt holes 159 and the bolt holes 169 have the shape as described above.

By this sliding, among the pair, the plate member 151 comes close to one side surface of the two adjacent cages 36, and the plate member 161 comes close to the other side surface of the two cages 36 (see FIG. 59). As a result, the heat sink 158 and the heat sink 168 may further efficiently absorb the heat generated from pluggable modules 37-1 to 37-6 via the cages 36-1 to 36-6.

As described above, according to the present exemplary embodiment, the optical transmission device 10 includes the heat sink 158 which has the plate member 151 arranged between two adjacent cages 36. The optical transmission device 10 further includes the heat sink 168 which has the plate member 161 arranged between two adjacent cages 36.

By the configuration of the optical transmission device 10, the heat dissipation efficiency may be further improved.

In an exemplary embodiment (variation 9), like in the exemplary embodiment (variation 8), the optical transmission device includes a first heat sink and a second heat sink.

[Configuration of Optical Transmission Device]

Figure 64:
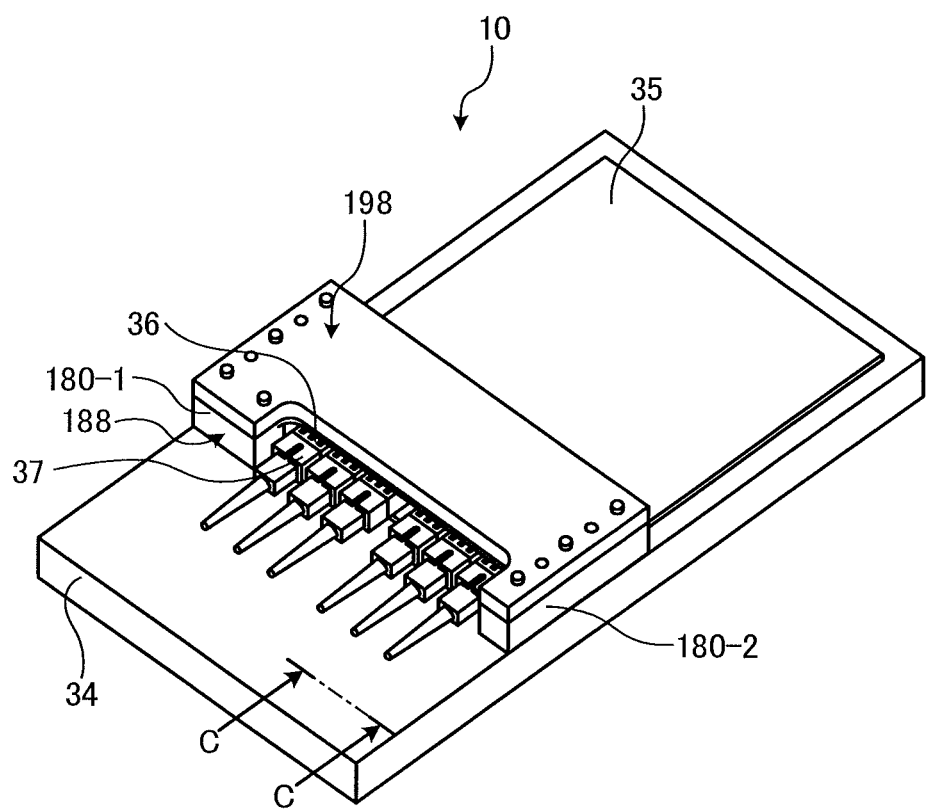
FIG. 64 is a view for explaining a configuration example of an optical transmission device of an exemplary embodiment (variation 9)

FIG. 64 is a view for explaining a configuration example of an optical transmission device of the exemplary embodiment (variation 9). In FIG. 64, the optical transmission device 10 of the exemplary embodiment (variation 9) includes a heat sink 188 as a first heat sink and a heat sink 198 as a second heat sink.

Figure 65:
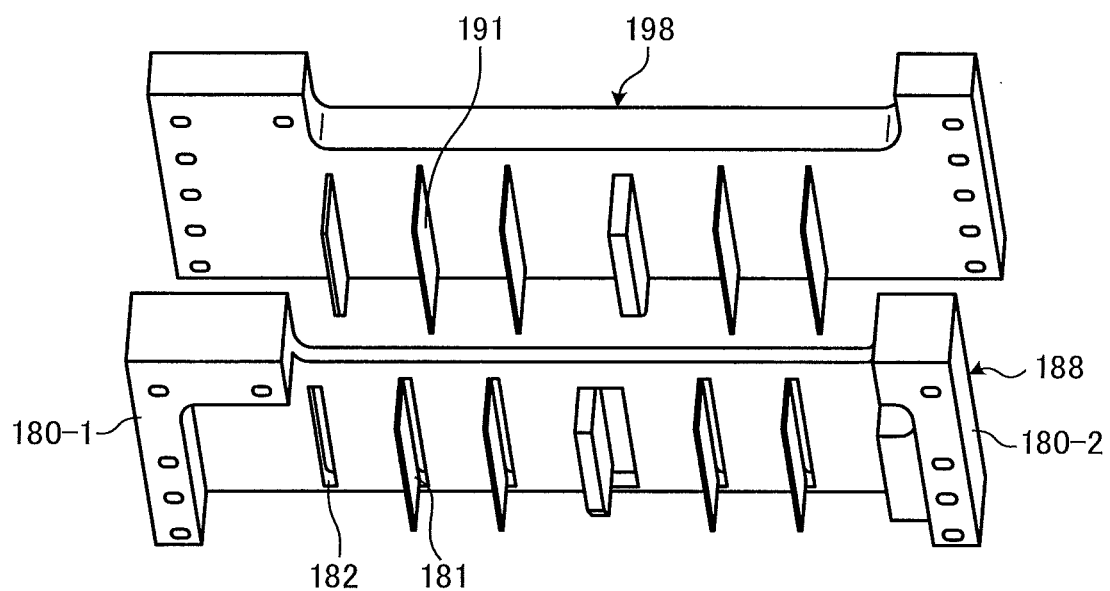
FIG. 65 is a view for explaining a configuration example of a first heat sink and a second heat sink of the exemplary embodiment (variation 9)

FIG. 65 is a view for explaining a configuration example of a first heat sink and a second heat sink of the exemplary embodiment (variation 9). As illustrated in FIG. 65, the heat sink 188 includes pedestal portions 180-1 and 180-2, and plate members 181. Like the plate member 41 of the exemplary embodiment, the plate member 181 is provided to rise from the bottom surface of the main body of the heat sink 188. Also, in the heat sink 188, a slit 182 is provided in parallel to the plate member 181 to penetrate the main body of the heat sink 188. Through the slit 182, a plate member 191 of the heat sink 198 which will be described later passes.

As illustrated in FIG. 65, the heat sink 198 includes plate members 191. Like the plate member 41 of the exemplary embodiment, the plate member 191 is provided to rise from the bottom surface of the main body of the heat sink 198.

Figure 66:
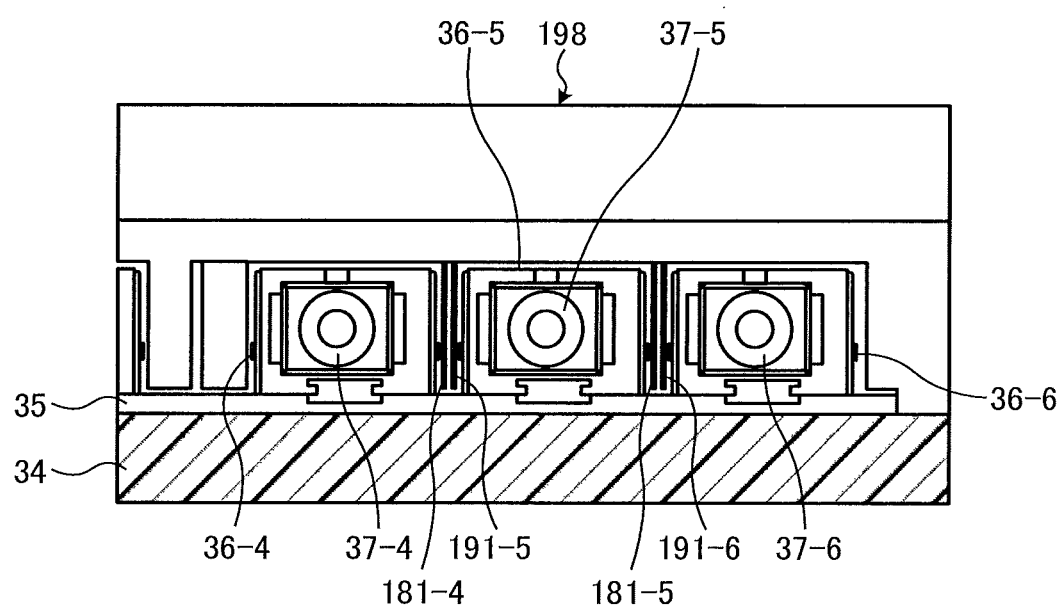
FIG. 66 is a cross-sectional view along the arrow C-C of FIG. 64.

Here, as illustrated in FIG. 64, the pedestal portions 180-1 and 180-2 are arranged so that the bottom surfaces of the pedestal portions 180-1 and 180-2 are abutted on both end portions of the heat transfer plate 34. In this state, as illustrated in FIG. 66, the plate member 181 is arranged between two adjacent cages 36. FIG. 66 is a cross-sectional view along the arrow C-C of FIG. 64. Also, the heat sink 198 is superimposed on the heat sink 188 so that the plate member 191 slips through the slit 182, and the bottom surface of the main body of the heat sink 198 is abutted on the top surface of the main body of the heat sink 188. In this state, as illustrated in FIG. 66, the plate member 191 is arranged between two adjacent cages 36. The plate member 181 is arranged to come close to one side of the two adjacent cages 36, and the plate member 191 is arranged to come close to the other side. That is, when attention is paid to the plate member 181-4 and the plate member 191-5, the plate member 181-4 is arranged to come close to the cage 36-4 side, and the plate member 191-5 is arranged to come close to the cage 36-5 side. Accordingly, since the plate member 181 and the plate member 191 may be disposed to come close to the side surfaces of the cages 36, the heat dissipation efficiency in the optical transmission device 10 may be improved.

[Manufacturing Method of Optical Transmission Device]

A manufacturing method of the optical transmission device configured as described above will be described. FIGS. 67 to 70 are views for explaining the manufacturing method of the optical transmission device of the exemplary embodiment (variation 9). Herein, especially, referring to FIGS. 67 to 70, an assembly process of the optical transmission device 10 of the exemplary embodiment (variation 9) will be described.

Figure 67:
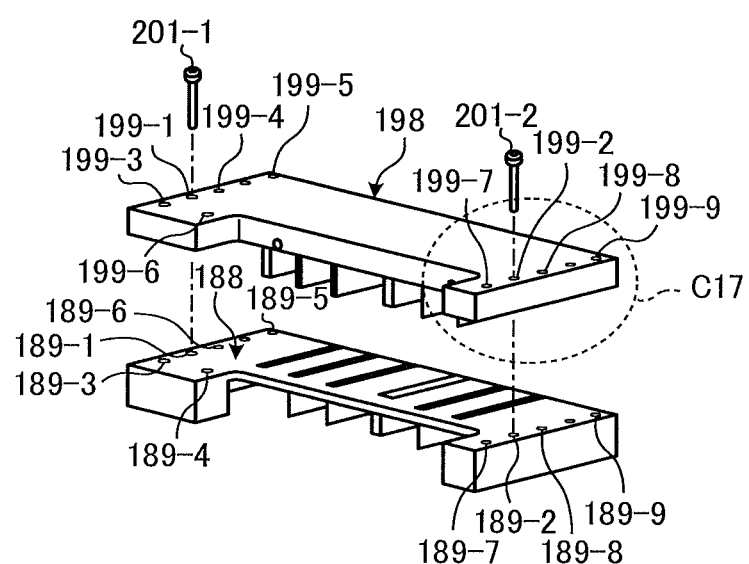
FIG. 67 is a view for explaining a manufacturing method of the optical transmission device of the exemplary embodiment (variation 9)
Figure 68:
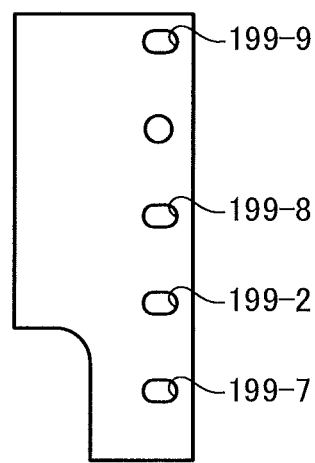
FIG. 68 is a view for explaining the manufacturing method of the optical transmission device of the exemplary embodiment (variation 9)

As illustrated in FIG. 67, bolt holes 189-1 and 189-3 to 189-6 are provided at one end portion of the main body of the heat sink 188, and bolt holes 189-2 and 189-7 to 189-9 are provided at the other end portion. Also, bolt holes 199-1 and 199-3 to 199-6 are provided at one end portion of the main body of the heat sink 198, and bolt holes 199-2 and 199-7 to 199-9 are provided at the other end portion. FIG. 68 is a view illustrating a portion within a circle C17 of FIG. 67. As illustrated in FIG. 68, each of the bolt holes 199-2 and 199-7 to 199-9 is formed into, for example, a shape including a combination of a rectangle and two semicircles whose diameters are two opposite sides of the rectangle, respectively, or an oval shape. This shape is common in all of the bolt holes 189 and the bolt holes 199.

Figure 69:
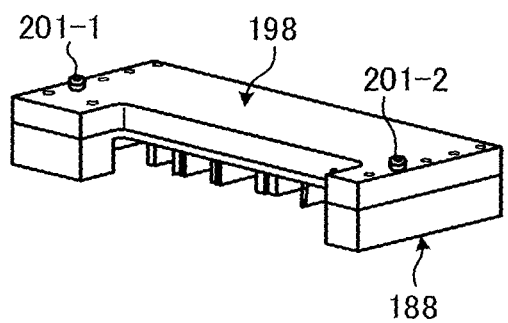
FIG. 69 is a view for explaining the manufacturing method of the optical transmission device of the exemplary embodiment (variation 9)

Then, as illustrated in FIGS. 67 and 69, a bolt 201-1 is inserted into the bolt hole 199-1 and the bolt hole 189-1, and a bolt 201-2 is inserted into the bolt hole 199-2 and the bolt hole 189-2, thereby coupling the heat sink 188 with the heat sink 198. In this state, the plate member 181 and the plate member 191 arranged between two same cages 36 are placed in a state where one side surfaces of the plate member 181 and the plate member 191 are in almost contact with each other.

Figure 70:
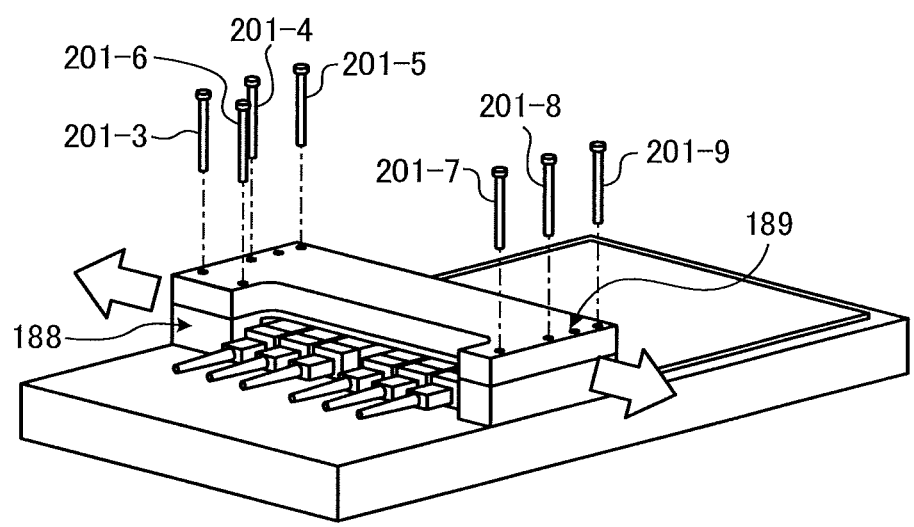
FIG. 70 is a view for explaining the manufacturing method of the optical transmission device of the exemplary embodiment (variation 9)

In this state, as illustrated in FIG. 70, the assembly of the heat sink 188 and the heat sink 198 is arranged so that a pair of the plate member 181 and the plate member 191 whose one side surfaces are in almost contact with each other is located between two adjacent cages 36. Then, bolts 201-3 to 201-9 are inserted into the bolt holes 199-3 to 199-9 and the bolt holes 189-3 to 189-9, respectively.

In this state, the heat sink 188 and the heat sink 198 are slid in the directions of the arrows in FIG. 70, respectively. This sliding is enabled by the fact that the bolt holes 189 and the bolt holes 199 have the shape as described above.

By this sliding, among the pair, the plate member 181 comes close to one side surface of the two adjacent cages 36, and the plate member 191 comes close to the other side surface of the two cages 36 (see FIG. 66). As a result, the heat sink 188 and the heat sink 198 may further efficiently absorb the heat generated from the pluggable modules 37-1 to 37-6 via the cages 36-1 to 36-6.

As described above, according to the present exemplary embodiment, the optical transmission device 10 includes the heat sink 188 which has the plate member 181 arranged between two adjacent cages 36. The optical transmission device 10 further includes the heat sink 198 which has the plate member 191 arranged between two adjacent cages 36.

By the configuration of the optical transmission device 10, the heat dissipation efficiency may be further improved.

[Exemplary Embodiment 11]

In the exemplary embodiment 11, as in the exemplary embodiment 9, an optical transmission device includes a first heat sink and a second heat sink.

[Configuration of Optical Transmission Device]

Figure 71:
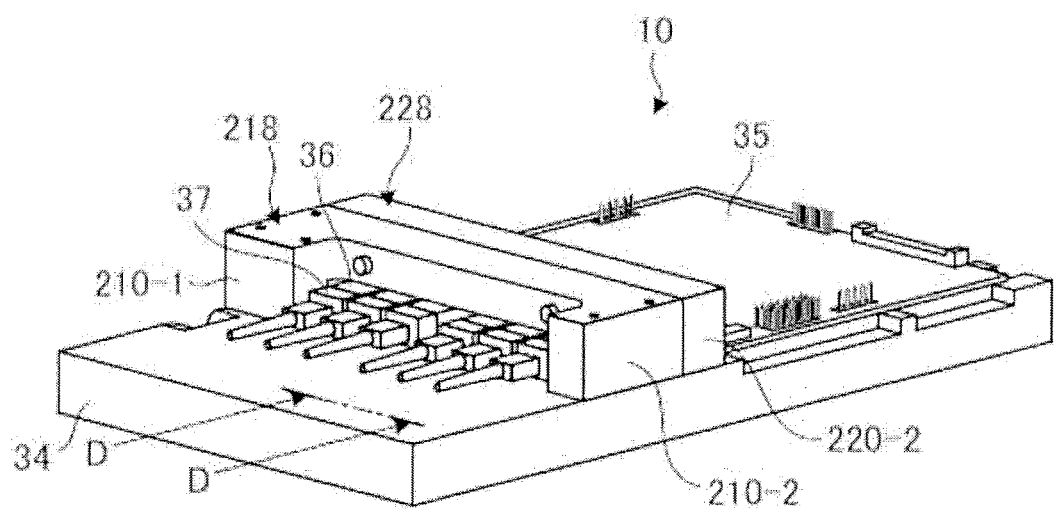
FIG. 71 is a view explaining an exemplary configuration of an optical transmission device of the exemplary embodiment 11.

FIG. 71 is a view explaining an exemplary configuration of an optical transmission device of the exemplary embodiment 11. In FIG. 71, the optical transmission device 10 of the exemplary embodiment 11 includes a heat sink 218 serving as a first heat sink and a heat sink 228 serving as a second heat sink.

Figure 72:
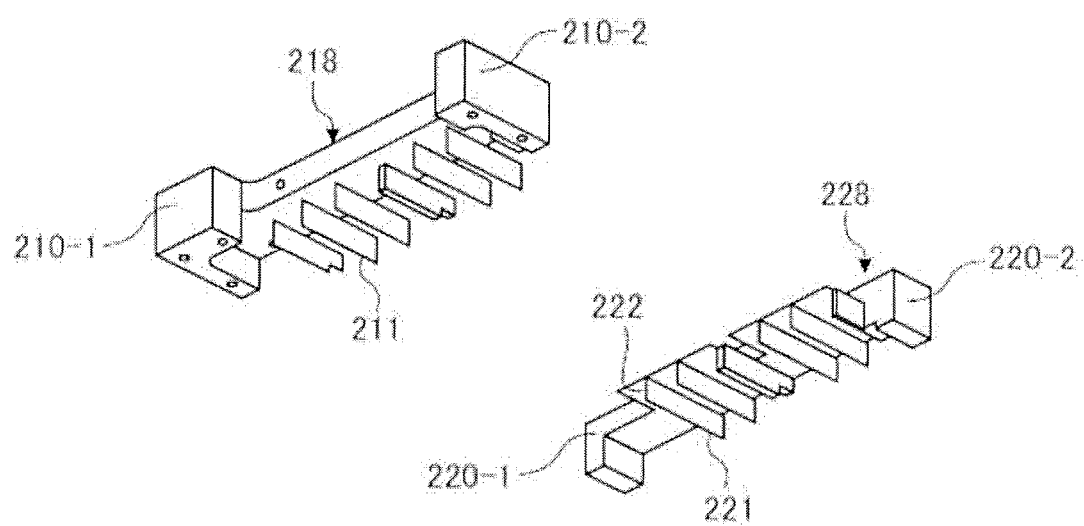
FIG. 72 is a view explaining an exemplary configuration of the first heat sink and the second heat sink of the exemplary embodiment 11.

FIG. 72 is a view explaining an exemplary configuration of the first heat sink and the second heat sink of the exemplary embodiment 11. As illustrated in FIG. 72, the heat sink 218 includes pedestal portions 210-1 and 210-2, and plate members 211. As in the plate member 158 of the exemplary embodiment 9, the plate member 211 is provided to rise from the bottom surface of the main body of the heat sink 218. Also, the plate member 211 includes a portion protruding from the main body of the heat sink 218 toward the heat sink 228.

As illustrated in FIG. 72, the heat sink 228 includes pedestal portions 220-1 and 220-2, and plate members 221 and 222. As in the plate member 161 of the exemplary embodiment 9, the plate member 221 is provided to rise from the bottom surface of the main body of the heat sink 228. Also, the plate member 221 includes a portion protruding from the main body of the heat sink 228 toward the heat sink 218. The plate member 222 is provided to rise from the front surface of the heat sink 228 (that is, a surface facing the heat sink 218) toward the heat sink 218. The one end of the plate member 222 in the lateral direction is coupled to the plate member 221. That is, when the heat sink 228 is seen from the front side, the plate member 221 and the plate member 222 are arranged to form a reverse-L shape.

Figure 73:
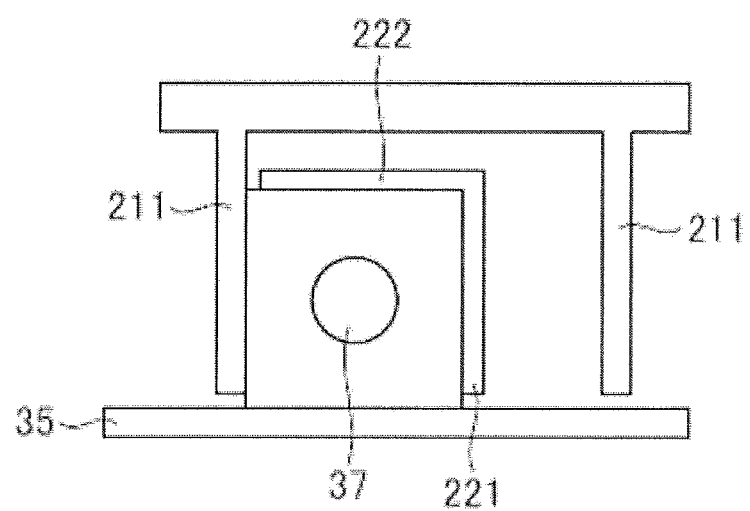
FIG. 73 is a cross-sectional view along the arrow D-D of FIG. 71.

The pedestal portions 210-1 and 210-2 are arranged so that the bottom surfaces of the pedestal portions 210-1 and 210-2 are abutted on both end portions of the heat transfer plate 34. In this state, as illustrated in FIG. 73, the plate member 211 is arranged between two adjacent cages 36. FIG. 73 is a cross-sectional view along the arrow D-D of FIG. 71. Also, the pedestal portions 220-1 and 220-2 are arranged such that the bottom surfaces of the pedestal portions 220-1, and 220-2 are abutted on both end portions of the heat transfer plate 34. In this state, as illustrated in FIG. 73, the plate member 221 is arranged between two adjacent cages 36. In this state, the plate member 222 is arranged to be abutted on the top surface of the cage 36.

Here, the protruding portion of the plate member 211 penetrates under the main body of the heat sink 228. The protruding portion of the plate member 221 penetrates under the main body of the heat sink 218. The plate member 222, as in the plate member 221, penetrates under the main body of the heat sink 218. The plate member 211 is arranged to come close to one side of the two adjacent cages 36, and the plate member 221 is arranged to come close to the other side. Accordingly, since the plate member 211 and the plate member 221 may be disposed to come close to the side surfaces of the cages 36, the heat dissipation efficiency in the optical transmission device 10 may be improved. Also, since the plate member 222 is arranged to be abutted on the top surface of the cage 36, the heat dissipation efficiency in the optical transmission device 10 may be further improved.

[Manufacturing Method of Optical Transmission Device]

A manufacturing method of the optical transmission device configured as described above will be described. FIGS. 74 to 79 are views for explaining the manufacturing method of the optical transmission device of the exemplary embodiment 11. Herein, especially, referring to FIGS. 74 to 79, an assembly process of the optical transmission device 10 of the exemplary embodiment 11 will be described.

Figure 74:
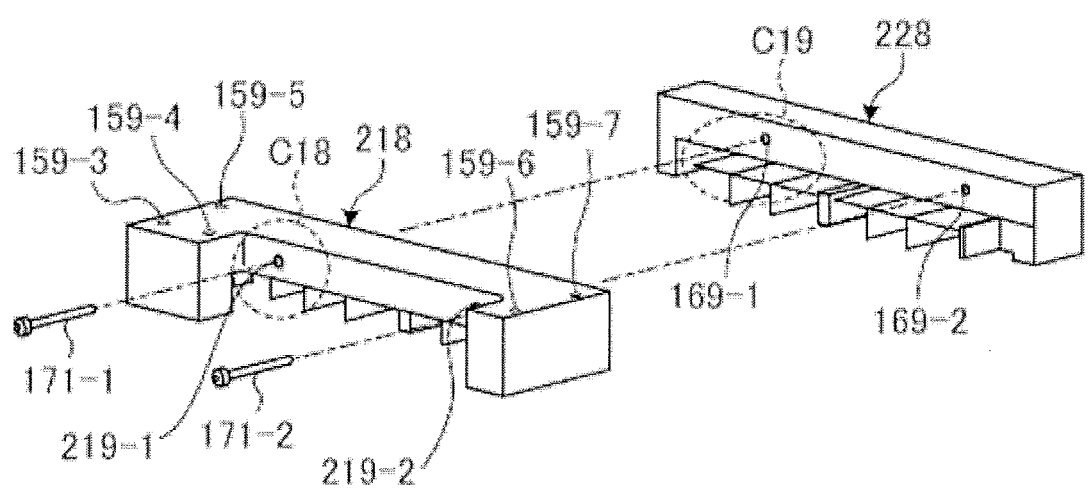
FIG. 74 is an assembly process of the optical transmission device 10 of the exemplary embodiment 11.
Figure 75:
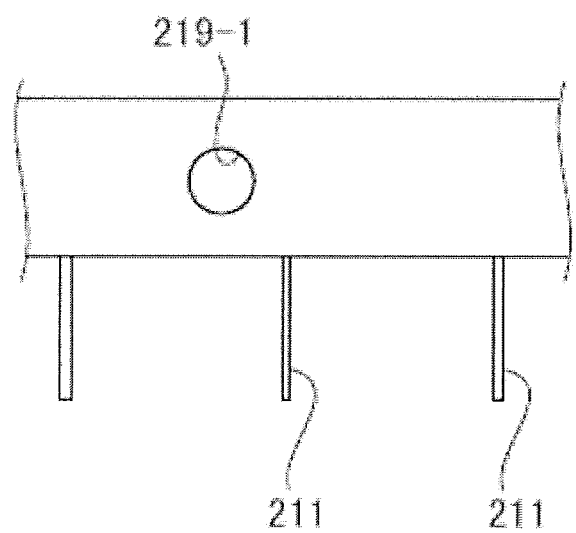
FIG. 75 is an assembly process of the optical transmission device 10 of the exemplary embodiment 11.
Figure 76:
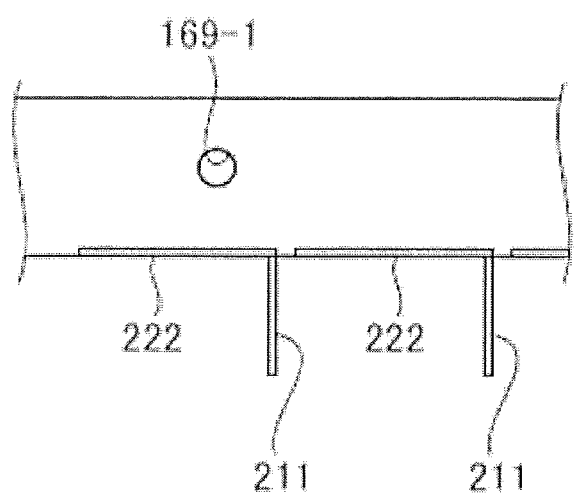
FIG. 76 is an assembly process of the optical transmission device 10 of the exemplary embodiment 11.

As illustrated in FIG. 74, bolt holes 219-1 and 219-2 are provided at a side surface of the main body of the heat sink 218. Also, bolt holes 159-3 to 159-5 are provided at one end portion of the main body of the heat sink 218, and bolt holes 159-6 and 159-7 are provided at the other end portion in the same manner as the heat sink 158 in the exemplary embodiment 9. Also, bolt holes 169-1 and 169-2 are provided at the side surface of the main body of the heat sink 228 in the same manner as the heat sink 168 in the exemplary embodiment 9. FIG. 75 is a view illustrating the inside of a circle C18 of FIG. 74, in an enlarged scale. FIG. 76 is a view illustrating the inside of a circle C19 of FIG. 74, in an enlarged scale. As illustrated in FIGS. 75 and 76, the inner diameter of the bolt hole 219 is larger than the outer diameter of the shaft of the bolt 171, and the inner diameter of the bolt hole 169 is substantially the same as the outer diameter of the shaft of the bolt 171.

Figure 77:
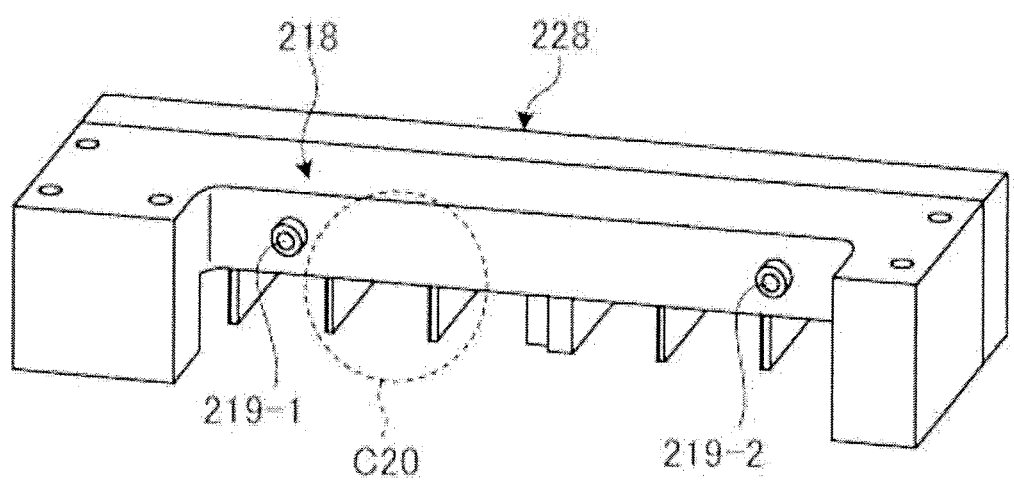
FIG. 77 is an assembly process of the optical transmission device 10 of the exemplary embodiment 11.
Figure 78:
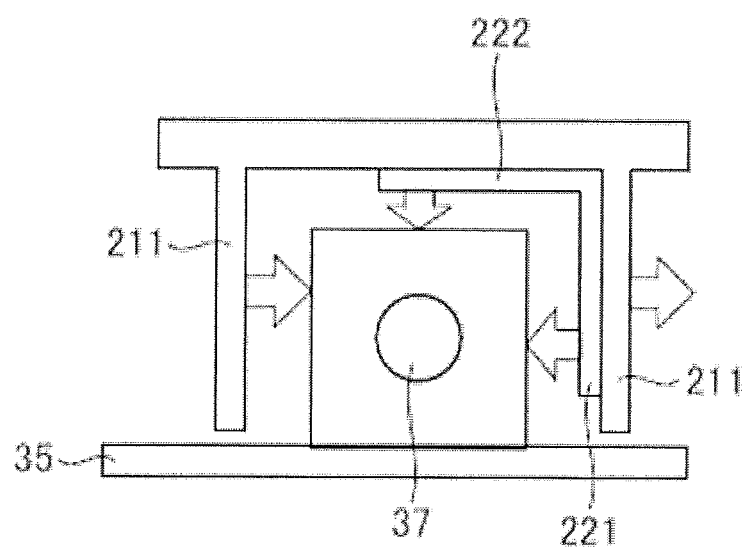
FIG. 78 is an assembly process of the optical transmission device 10 of the exemplary embodiment 11.

As illustrated in FIGS. 74 and 77, the bolt 171-1 is inserted into the bolt hole 169-1 through the bolt hole 219-1, and strongly screwed, and the bolt 171-2 is inserted into the bolt hole 169-2 through the bolt hole 219-2 and strongly screwed, thereby coupling the heat sink 218 with the heat sink 228. Accordingly, the heat sink 218 and the heat sink 228 may be suppressed from being relatively shifted due to a friction force on the pressure-contact surface between the heat sink 218 and the heat sink 228. In this state, the plate member 211 and the plate member 221 arranged between two same cages 36 are placed in a state where one side surface of the plate member 211 and the plate member 221 are in an almost contact state with each other as illustrated in FIG. 78. FIG. 78 is a view illustrating the portion surrounded by a circle C20 of FIG. 77, in an enlarged scale. Also, the plate member 222, as illustrated in FIG. 78, is placed in a state where the top surface of the plate member 222 is in an almost contact state with the bottom surface of the main body of the heat sink 218. Here, as described above, the inner diameter of the bolt hole 219 is larger than the outer diameter of the shaft of the bolt 171 and the inner diameter of the bolt hole 169 is substantially the same as the outer diameter of the shaft of the bolt 171. Accordingly, when the bolt 171 is unscrewed from the bolt hole 169, the friction force on the contact surface between the heat sink 218 and the heat sink 228 is reduced, and thus, the heat sink 218 and the heat sink 228 may be relatively shifted in a range of the bolt hole 219 in a state where the bolt 171 is screwed in the bolt hole 169 through the bolt hole 219.

Figure 79:
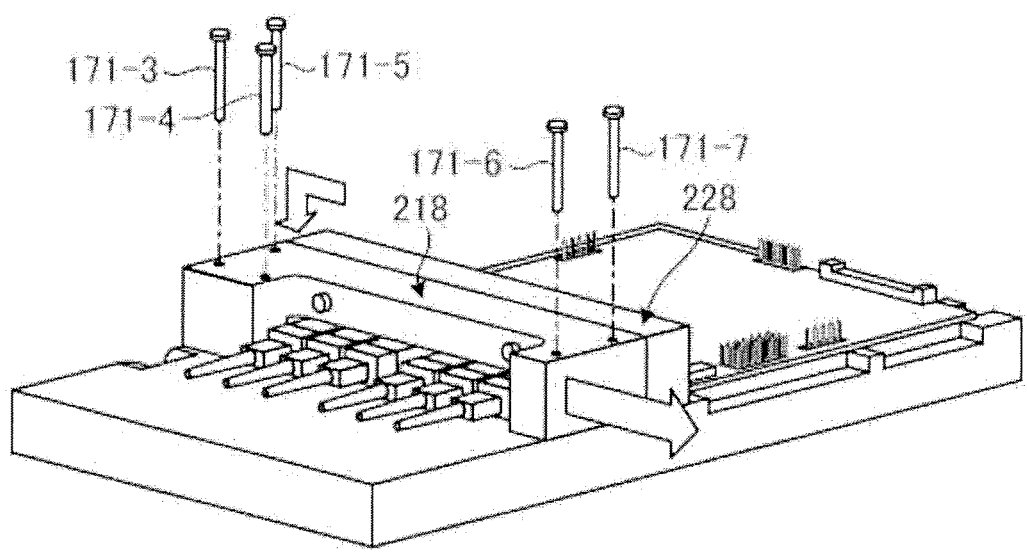
FIG. 79 is an assembly process of the optical transmission device 10 of the exemplary embodiment 11.

In this state, as illustrated in FIG. 79, the assembly of the heat sink 218 and the heat sink 228 is arranged such that a pair of the plate member 211 and the plate member 221 of which one side surfaces are in an almost contact state with each other is located between two adjacent cages 36. Then, bolts 171-3 to 171-7 are inserted into the bolt holes 159-3 to 159-7, respectively.

In this state, each of the heat sink 218 and the heat sink 228 is slid in the directions of the arrows of FIG. 79. That is, the heat sink 228 is slid downward with respect to the heat sink 218. Also, the heat sink 218 and the heat sink 228 are relatively slid in a horizontal direction. Also, the above description is made on the assumption that the inner diameter shape of the bolt hole 219 is a circle, but the present disclosure is not limited thereto. In short, the bolt hole 219 may have a shape which allows the above described downward and horizontal sliding. That is, for example, the bolt hole 219-1 may be formed into an elliptical or oval shape downward toward the pedestal portion 210-1, which is, for example, the left side of the heat sink 218, and the bolt hole 219-2 may be formed into an elliptical or oval shape downward toward the pedestal portion 210-2, which is, for example, the right side of the heat sink 218. Alternatively, the bolt hole 219-1 may be formed in a combination of an elliptical shape or oval shape in parallel to the bottom surface of the heat sink 218 with an elliptical shape or oval shape extending downward from the left end of the ellipse or oval. The bolt hole 219-2 may be formed in a combination of an elliptical shape or oval shape in parallel to the bottom surface of the heat sink 218, with an elliptical shape or oval shape extending downward from the right end of the ellipse or oval.

By this sliding, among the pair, the plate member 211 comes close to one side surface of the two adjacent cages 36, and the plate member 221 comes close to the other side surface of the two cages 36 (see FIG. 73). Also, by this sliding, the bottom surface of the plate member 222 comes close to the top surface of the cage 36. As a result, the heat sink 218 and the heat sink 228 may further efficiently absorb the heat generated from the pluggable modules 37 via the cages 36. In this state, the bolt 171 is screwed strongly in the bolt hole 169 via the bolt hole 219 again.

As described above, according to the present exemplary embodiment, the optical transmission device 10 includes the heat sink 218 which in turn includes the plate member 211 arranged between two adjacent cages 36. The optical transmission device 10 further includes the heat sink 228 which in turn includes the plate member 221 arranged between two adjacent cages 36, and the plate member 222 arranged to come close to the top surface of the cage 36.

In the configuration of the optical transmission device 10, since the heat sink 218 and the heat sink 228 are disposed to come close to three side surfaces of the cage 36, the heat dissipation efficiency may be further improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An optical transmission device comprising:
   a first cage and a second cage provided in parallel on a top surface of a substrate, into which modules connectable to an optical transmission path are inserted, respectively;
   a first heat sink including:
      a first main body arranged along surfaces of the first cage and the second cage at a second side of the substrate that is an opposite side relative to the top surface of the substrate,
      a first plate member rising from a bottom surface of the first main body which faces the substrate, and arranged between the first cage and the second cage,
      a first pedestal portion rising from the bottom surface of the first main body at one end portion of the first main body in a direction perpendicular to the first plate member, and
      a second pedestal portion rising from the bottom surface of the first main body at the other end portion of the first main body;
   a heat transfer plate having a first surface which has a first portion on which the substrate is arranged in a state where the first surface faces a bottom surface of the substrate and a second portion on which the substrate is not arranged; and
   a coupling member configured to couple the first pedestal portion and the second pedestal portion with the second portion of the heat transfer plate.

2. The optical transmission device according to claim 1, wherein the coupling member comprises a first guide pin and a second guide pin, on the first surface of the heat transfer plate, on both end portions of the heat transfer plate which exclude a region where the substrate is arranged, rising from the first surface, and being longer than a separation distance from the top surface of the substrate to the surfaces of the first cage and the second cage at the opposite side to the substrate,
   wherein the first pedestal portion includes a first insertion hole into which the first guide pin is inserted, and the second pedestal portion includes a second insertion hole into which the second guide pin is inserted.

3. The optical transmission device according to claim 2, wherein the first guide pin includes a first rod-shaped portion, and a first distal end portion having a larger cross-sectional area than the first rod-shaped portion, the second guide pin includes a second rod-shaped portion, and a second distal end portion having a larger cross-sectional area than the second rod-shaped portion, the first insertion hole includes a first cylindrical portion, and a second cylindrical portion having a larger diameter than the first cylindrical portion and configured to accommodate the first distal end portion, and the second insertion hole includes a third cylindrical portion, and a fourth cylindrical portion having a larger diameter than the third cylindrical portion and configured to accommodate the second distal end portion.

4. The optical transmission device according to claim 2, wherein the first guide pin includes a first rod-shaped portion, and a first distal end portion having a larger cross-sectional area than the first rod-shaped portion, the second guide pin includes a second rod-shaped portion, and a second distal end portion having a larger cross-sectional area than the second rod-shaped portion, the first insertion hole is a through hole penetrating a bottom surface of the first pedestal portion and a top surface of the first main body, the second insertion hole is a through hole penetrating a bottom surface of the second pedestal portion and the top surface of the first main body, a depth of the first insertion hole is smaller than a length of the first rod-shaped portion, and a depth of the second insertion hole is smaller than a length of the second rod-shaped portion.

5. The optical transmission device according to claim 2, wherein a cross-sectional area of the first guide pin decreases from the first surface side toward a distal end side of the first guide pin, and
a cross-sectional area of the second guide pin decreases from the first surface side toward a distal end side of the second guide pin.

6. The optical transmission device according to claim 1, wherein the first heat sink includes, as a coupling member, a first guide pin rising from a bottom surface of the first pedestal portion which faces the first surface of the heat transfer plate, and a second guide pin rising from a bottom surface of the second pedestal portion which faces the first surface of the heat transfer plate, and the heat transfer plate includes a first insertion hole and a second insertion hole provided, on the first surface, on both end portions of the heat transfer plate which exclude a region where the substrate is arranged, into which the first guide pin and the second guide pin are inserted, respectively, and each of the first guide pin and the second guide pin is longer than a separation distance from the top surface of the substrate to the surfaces of the first cage and the second cage at the opposite side to the substrate.

7. The optical transmission device according to claim 6, wherein the first guide pin includes a first rod-shaped portion, and a first distal end portion having a larger cross-sectional area than the first rod-shaped portion, the second guide pin includes a second rod-shaped portion, and a second distal end portion having a larger cross-sectional area than the second rod-shaped portion, the first insertion hole is a through hole penetrating the first surface, and a second surface of the heat transfer plate at the opposite side to the first surface, the second insertion hole is a through hole penetrating the first surface, and the second surface, a depth of the first insertion hole is smaller than a length of the first rod-shaped portion, and a depth of the second insertion hole is smaller than a length of the second rod-shaped portion.

8. The optical transmission device according to claim 6, wherein a cross-sectional area of the first guide pin decreases from the bottom surface side of the first pedestal portion toward a distal end side of the first guide pin, and
a cross-sectional area of the second guide pin decreases from the bottom surface side of the second pedestal portion toward a distal end side of the second guide pin.

9. The optical transmission device according to claim 1, wherein a cross-sectional area of the first plate member decreases from the first main body side toward a distal end side.

10. The optical transmission device according to claim 1, further comprising a second heat sink which includes:
a second main body, and
a second plate member rising from a bottom surface of the second main body which faces the substrate, having a portion protruding from the second main body, and arranged between the first cage and the second cage.

11. The optical transmission device according to claim 1, wherein the first main body includes a slit-shaped through hole provided at a position apart from the first plate member by a predetermined distance, and the optical transmission device further includes a second heat sink which includes: a second main body, and a second plate member rising from a bottom surface of the second main body which faces the substrate, configured to be inserted into the slit-shaped through hole, and arranged between the first cage and the second cage.

12. A method of manufacturing an optical transmission device which includes a first cage and a second cage provided in parallel on a top surface of a substrate, into which modules connectable to an optical transmission path are inserted, respectively, and a heat sink including a main body arranged along surfaces of the first cage and the second cage at the opposite side to the substrate, the method comprising:
inserting a first guide pin and a second guide pin into a first insertion hole and a second insertion hole, respectively to arrange a plate member between the first cage and the second cage, and
rotating the heat sink along a first surface of a heat transfer plate to assemble the heat sink with the heat transfer plate,
wherein the heat sink further includes the plate member rising from a bottom surface of the main body which faces the substrate, a first pedestal portion rising from the bottom surface of the main body at one end portion of the main body in a direction perpendicular to the plate member, and a second pedestal portion rising from the bottom surface of the main body at the other end portion of the main body, the optical transmission device further includes:
the heat transfer plate having the first surface on which the substrate is arranged in a state where the first surface faces a bottom surface of the substrate at the opposite side to the top surface of the substrate; and
the first guide pin and the second guide pin provided, on the first surface of the heat transfer plate, on both end portions of the heat transfer plate which exclude a region where the substrate is arranged, rising from the first surface, and being longer than a separation distance from the top surface of the substrate to the surfaces of the first cage and the second cage at the opposite side to the substrate, and the first pedestal portion includes the first insertion hole into which the first guide pin is inserted, the second pedestal portion includes the second insertion hole into which the second guide pin is inserted, the first guide pin includes a first rod-shaped portion, and a first distal end portion having a larger cross-sectional area than the first rod-shaped portion, the second guide pin includes a second rod-shaped portion, and a second distal end portion having a larger cross-sectional area than the second rod-shaped portion, the first insertion hole includes a first cylindrical portion, and a second cylindrical portion having a larger diameter than the first cylindrical portion and configured to accommodate the first distal end portion, and the second insertion hole includes a third cylindrical portion, and a fourth cylindrical portion having a larger diameter than the third cylindrical portion and configured to accommodate the second distal end portion.

13. A method of manufacturing an optical transmission device which includes a first cage and a second cage provided in parallel on a top surface of a substrate, into which modules connectable to an optical transmission path are inserted, respectively, and a heat sink including a main body arranged along surfaces of the first cage and the second cage at the opposite side to the substrate, the method comprising:
  inserting a first guide pin and a second guide pin into a first insertion hole and a second insertion hole, respectively to arrange a plate member between the first cage and the second cage, and
  rotating the heat sink along a first surface of a heat transfer plate to assemble the heat sink with the heat transfer plate,
    wherein the heat sink includes the plate member rising from a bottom surface of the main body which faces the substrate, a first pedestal portion rising from the bottom surface of the main body at one end portion of the main body in a direction perpendicular to the plate member, a second pedestal portion rising from the bottom surface of the main body at the other end portion of the main body, the first guide pin rising from a bottom surface of the first pedestal portion which faces the first surface of the heat transfer plate, and the second guide pin rising from a bottom surface of the second pedestal portion which faces the first surface of the heat transfer plate, the optical transmission device includes: the heat transfer plate having the first surface on which the substrate is arranged in a state where the first surface faces a bottom surface of the substrate at the opposite side to the top surface of the substrate; and the first insertion hole and the second insertion hole provided, on the first surface, on both end portions of the heat transfer plate which exclude a region where the substrate is arranged, into which the first guide pin and the second guide pin are inserted, respectively, and the first guide pin includes a first rod-shaped portion, and a first distal end portion having a larger cross-sectional area than the first rod-shaped portion, the second guide pin includes a second rod-shaped portion, and a second distal end portion having a larger cross-sectional area than the second rod-shaped portion, each of the first guide pin and the second guide pin is longer than a separation distance from the top surface of the substrate to the surfaces of the first cage and the second cage at the opposite side to the substrate, the first insertion hole includes a first cylindrical portion, and a second cylindrical portion having a larger diameter than the first cylindrical portion and configured to accommodate the first distal end portion, and the second insertion hole includes a third cylindrical portion, and a fourth cylindrical portion having a larger diameter than the third cylindrical portion and configured to accommodate the second distal end portion.

* * * * *